United States Patent [19]

Baba et al.

[11] Patent Number: 4,626,898
[45] Date of Patent: Dec. 2, 1986

[54] COLOR CAMERA USING DIGITAL SIGNAL PROCESSING TECHNIQUES

[75] Inventors: Takaaki Baba, Kounan, Japan; Gerald T. O'Keefe, Cupertino, Calif.

[73] Assignee: Matsushita Electric Industrial Co., Ltd., Osaka, Japan

[21] Appl. No.: 595,379

[22] Filed: Mar. 30, 1984

[30] Foreign Application Priority Data

Mar. 31, 1983 [JP] Japan .................................. 58-53913

[51] Int. Cl.$^4$ ......................... H04N 9/077; H04N 9/07
[52] U.S. Cl. ......................................... 358/48; 358/44
[58] Field of Search ........................ 358/41, 43, 44, 48

[56] References Cited

U.S. PATENT DOCUMENTS

| | | | |
|---|---|---|---|
| 4,121,244 | 10/1978 | Nakabe | 358/44 |
| 4,200,883 | 4/1980 | Yamanaka et al. | 358/44 |
| 4,205,336 | 5/1980 | Nagumo | 358/43 |
| 4,345,270 | 8/1982 | Nagumo et al. | 358/44 |
| 4,450,475 | 5/1984 | Ishikawa et al. | 358/44 |
| 4,490,738 | 12/1984 | Asaida | 358/41 |
| 4,525,737 | 6/1985 | Hashimoto et al. | 358/44 |

FOREIGN PATENT DOCUMENTS

| | | | |
|---|---|---|---|
| 0057923 | 8/1982 | European Pat. Off. | 358/44 |
| 675 | 1/1980 | Japan | 358/44 |
| 109488 | 7/1982 | Japan | 358/44 |

Primary Examiner—John W. Shepperd
Assistant Examiner—Randall S. Svihla
Attorney, Agent, or Firm—Wenderoth, Lind & Ponack

[57] ABSTRACT

A digital color camera for converting an input optical image to a standard color television signal by using digital signal processing techniques includes: an image sensor for converting optical signals to a series of pixel signals; an analog to digital converting circuit for producing digital pixel signals; a digital signal detecting circuit for separating the digital pixel signals into a digital luminance signal and a digital chrominance difference signal; a digital chrominance signal processing circuit for producing two independent digital chrominance difference signals; a digital luminance signal correction circuit for making a gamma correction on the digital luminance signal; a color television signal encoding circuit for producing an analog standard color television signal from the two independent digital chrominance difference signals and the gamma corrected luminance signal. These circuits are controlled by timing pulses produced by a control timing generating circuit driven by a driving circuit. The digital signal detecting circuit includes: a pixel signal separation circuit for separating the digital pixel signals into two digital color pixel signals; a first digital addition circuit for adding the two digital color pixel signals; a pixel signal inverting circuit for inverting one of the two digital color pixel signals, and a second digital addition circuit for adding the other of the two digital color pixel signals with an output signal of the pixel signal inverting circuit.

21 Claims, 20 Drawing Figures

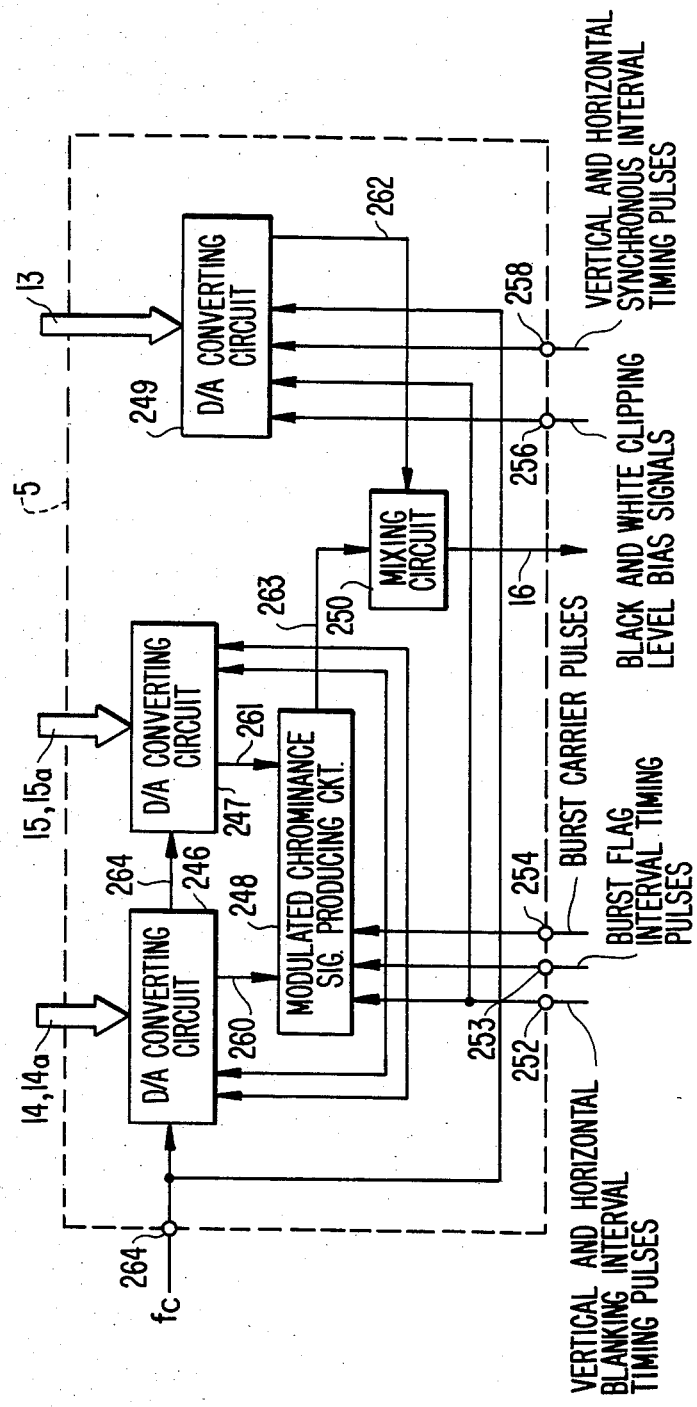

COLOR CAMERA USING DIGITAL SIGNAL PROCESSING TECHNIQUES

CROSS REFERENCE TO RELATED APPLICATIONS

The present application is an improvement over related U.S. application Ser. No. 549,812 bearing common inventorship with the present application.

BACKGROUND OF THE INVENTION (1) Field of the Invention

This invention relates to a color camera that is used in TV-studio camera systems, consumer VCR-camera systems, surveillance camera systems, and object-detection camera systems.

(2) Description of the Prior Art

Within recent years demands for consumer-used VCR systems have become vast. In accordance with this movement, developments of color cameras became active and a final goal of these developments is to realize a color camera which is very small sized, easy to use and low in power consumption.

The conventional methods to realize signal process parts of the color camera are mainly based on analog signal processing, so that the color camera using the conventional techniques has the following disadvantages:

(A) Analog signals which are converted signals of optical image signals are processed by passing through several analog signal process circuits, so an absolute signal to noise ratio (S/N) of the processed analog signals decays as they propagate from one process circuit to another. For the correction of the S/N decay, very complicated analog circuits requiring many adjustments thereof are needed. This complication decreases the stability and increases the power consumption of the color camera system.

(B) The conventional color camera using a color tube and analog circuits has many adjustment points on the production line. This makes it difficult to manufacture the color camera at a low cost.

(C) The conventional color camera using analog circuits includes very many extra circuit components so as to realize an auto white balanced color correction and an auto gamma correction of the luminance and chrominance signals.

(D) The conventional color camera using analog circuits requires one horizontal delay line as a basic function. This delay line is composed of inductance coils, capacitors, registers and some transistors. This means that it is impossible to fabricate the delay line and the other analog IC's into a monolithic IC chip.

As a summary of the above reasons, the conventional design methods using analog signal processing have their own limit in ability of realizing a color camera which is very small in size, uses mainly IC circuits, is very low in power consumption, is easy to use and very simple to produce.

SUMMARY OF THE INVENTION

It is a principal object of this invention to provide a color camera using digital circuits for its signal processing and to simplify the process circuitry so as to enable its fabrication by digital integrated circuits, wherein the process circuitry is composed of a signal detecting means, a chrominance signal processing means, a luminance signal processing means and a digital control means.

It is another object of this invention to reduce adjustment points on the signal processing means of a color camera by using digital control methods.

It is still another object of this invention to simplify the analog to digital converting means of a digital color camera.

It is a further object of this invention to provide a novel encoding means for receiving processed digital signals to produce a color television signal output of a digital color camera.

These objects are achieved according to this invention by a digital color camera comprising: an image sensing means for receiving optical signals to produce two alternately different pixel signals consisting of a first pixel signal and a second pixel signal, the first pixel signal being composed of two different $\alpha$ and $\beta$ color pixel signals which are shifted out at a repetition frequency of $f_c$ in one of two adjacent horizontal synchronous intervals of a television signal, and the second pixel signal being composed of two other different $\gamma$ and $\delta$ color pixel signals which are different from the $\alpha$ and $\beta$ color pixel signals and which are shifted out at a repetition frequency of $f_c$ in the other of the two adjacent horizontal synchronous intervals of the television signal; an analog to digital (A/D) converting means for converting said two alternately different pixel signals to a multiplexed digital pixel signal which is alternately different from one horizontal synchronous interval to the next horizontal synchronous interval; a digital signal detecting means for receiving said multiplexed digital pixel signal to produce a digital luminance signal and a digital chrominance difference signal which is alternately different from one horizontal synchronous interval to the next horizontal synchronous interval; a digital chrominance signal processing means for receiving said digital chrominance difference signal to produce two independent digital chrominance difference signals; a digital luminance signal correction means for receiving said digital luminance signal to produce a gamma corrected digital luminance signal; color television signal encoding means for receiving said two independent digital chrominance difference signals and the gamma corrected digital luminance signal to produce a color television signal; a control timing generating means for generating first, second and third sets of timing pulses, said first to third sets of timing pulses respectively controlling said A/D converting means, said digital signal detecting means and said digital chrominance signal processing means; and a driving means for driving said image sensing means, said color television signal encoding means and said control timing generating means.

Thus most basic signal processing means for a color camera, that is, the chrominance and luminance signal processing means are fabricated using only digital circuit components.

BRIEF DESCRIPTION OF THE DRAWINGS

The above and other objects, features and advantages of this invention will be apparent from consideration of the following description taken in connection with the accompanying drawings in which:

FIG. 18 is an example of a specific configuration of a color television signal encoding means.

DESCRIPTION OF THE PREFERRED EMBODIMENTS

Hereinafter, this invention will be described in detail.

Figure 1:
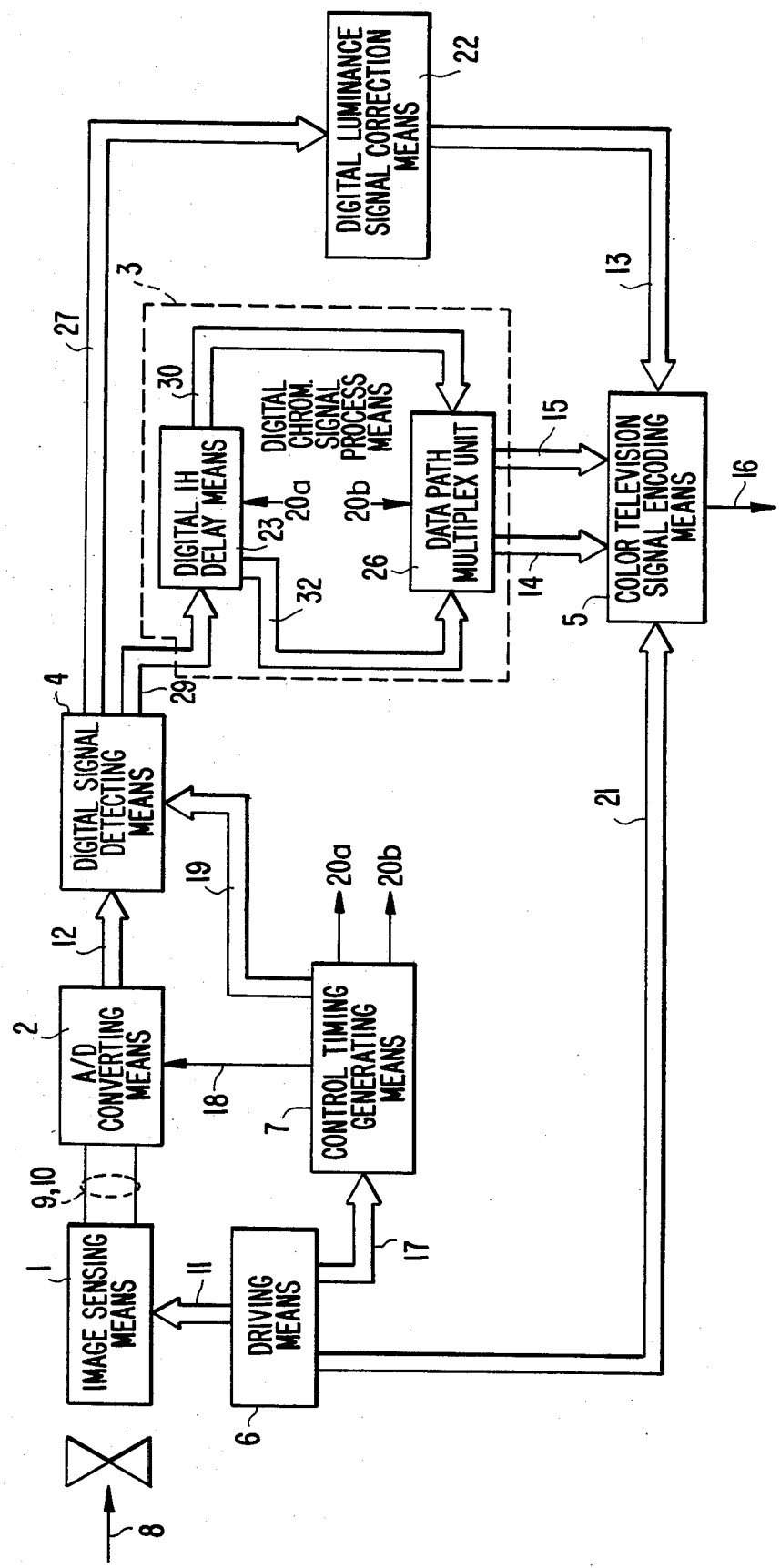
FIG. 1 is a basic block diagram of an embodiment of a digital color camera according to the present invention.

FIG. 1 is a basic block diagram of a digital camera in accordance with the present invention. An image sensing means 1 is connected to an A/D converting means 2. The A/D converting means 2 is connected to a digital signal detecting means 4. The digital signal detecting means 4 is connected to a digital luminance signal correcting means 22 and a digital chrominance signal processing means 3. The digital luminance signal correcting means 22 and the digital chrominance signal processing means 3 are connected to a color television signal encoding means 5. A driving means 6 is coupled to the image sensing means 1, a control timing generating means 7, and the color television signal encoding means 5.

The detailed operations of the means 1, 2, 3, 4, 5, 6, 7 and 22 will now be described. With receiving optical image signals 8, the image sensing means 1 produces two alternately different kinds of pixel signals—a first pixel signal 9 and a second pixel signal 10. The first pixel signal 9 is composed of two different color pixel signals which are shifted out alternately at a repetition frequency of $f_c$ in one of two adjacent horizontal synchronous intervals of a television signal. The second pixel signal 10 is composed of two other different color pixel signals which are different from the two color pixel signals of the first pixel signal 9 and are shifted out alternately at a repetition frequency of $f_c$ in the other of the two adjacent horizontal synchronous intervals of the television signal. This operation of the image sensing means 1 is controlled by control signals 11 supplied from the driving means 6. The pixel signals 9 and 10 are either analog signals or analog sampled signals. The pixel signals 9 and 10 are converted to a multiplexed digital pixel signal 12 by the A/D converting means 2. The digital pixel signal 12 is fed to the digital signal detecting means 4. This means 4 produces a digital chrominance difference signal 29 showing alternately different kinds of outputs from one horizontal synchronous interval to next horizontal synchronous interval and a digital luminance signal 27. The digital chrominance difference signal 29 is fed to the digital chrominance signal processing means 3. This processing means 3 produces a set of two independent digital chrominance signals 14 and 15. The digital luminance signal 27 is fed to the digital luminance signal correction means 22. This correction means 22 produces a gamma corrected digital luminance signal 13. The digital luminance signal 13 and the chrominance difference signals 14 and 15 are fed to the color television signal encoding means 5. The encoding means 5 produces a standard color television signal 16. This standard television signal may be an analog signal for some applications like in a compact color camera or may be a digital signal for other applications like in an object-detection camera. The A/D converting means 2, the digital signal detecting means 4, the digital chrominance signal processing means 3 and the color television signal encoding means 5 are respectively controlled by first, second and third sets of timing pulses 18, 19, 20a and 20b, which are generated by the control timing generating means 7 in accordance with a set of pulses 17 generated by the driving means 6 and by a fourth set of timing pulses 21 which are generated by the driving means 6.

As described above, the main signal processing portion of a color camera is effected by digital circuits. This is one of the major advantages of the present invention.

Figure 2:
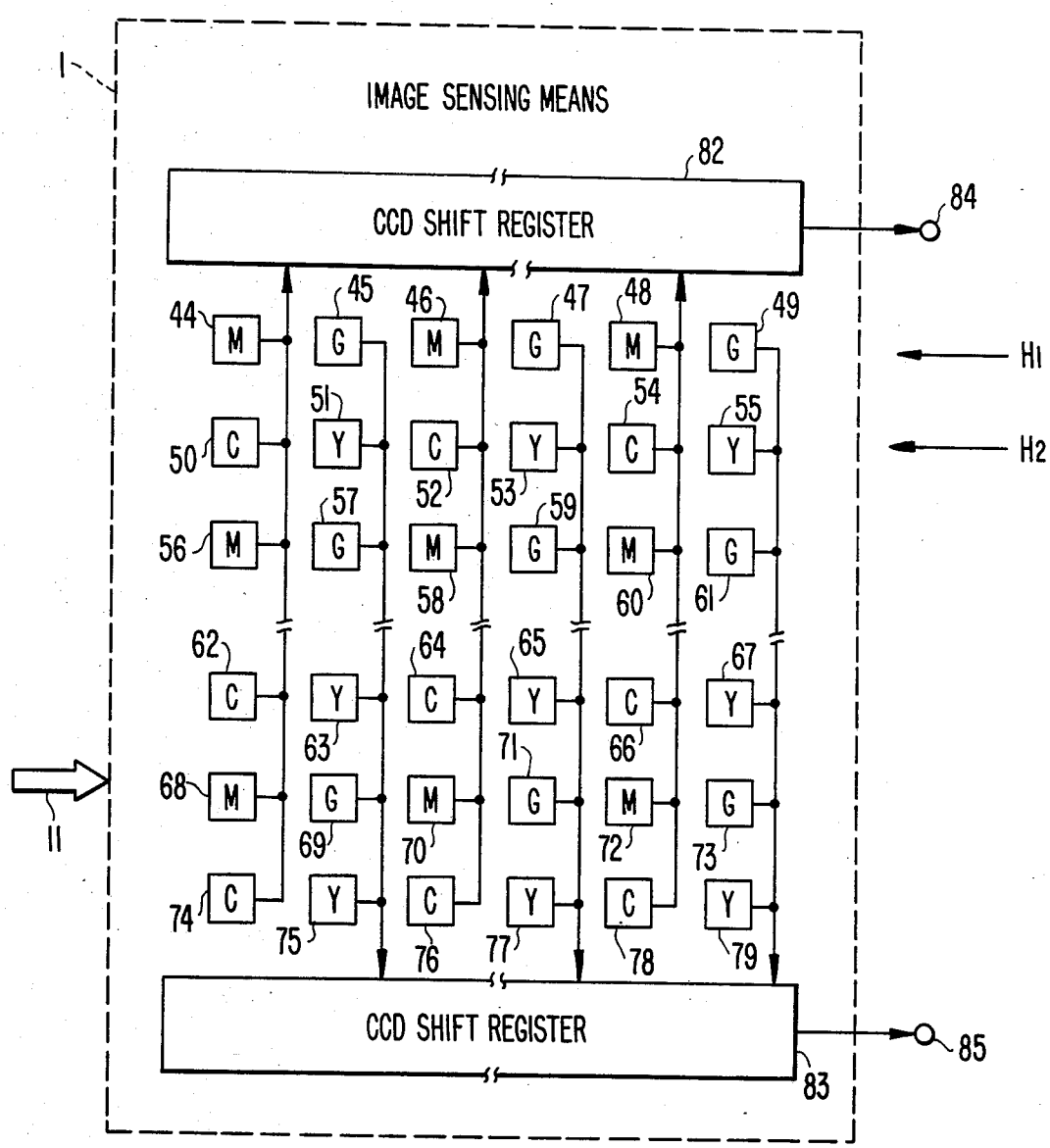
FIG. 2 is an example of an image sensing means used to explain the effect of the present invention.

FIG. 2 is one example of an image sensing means 1, in which a combination of magenta (M), green (G), cyan (C) and yellow (Y) color filters are placed on MOS structured photodiodes which form an array of pixel elements 44–79. In FIG. 2, the array is simplified for explanation purposes. Actually, the array is composed of several hundred pixel elements in both horizontal and vertical directions. At a start-timing of a horizontal synchronous interval H1, when a first row of pixel elements 44–49 is selected, the M pixel signals generated underneath the elements 44, 46, 48 are simultaneously transferred into a CCD (charge coupled device) shift register 82, and the G pixel signals generated underneath the elements 45, 47, 49 are simultaneously transferred into a CCD shift register 83. Then, these groups of M pixel signals and G pixel signals are respectively swept out through a terminal 84 and a terminal 85 during the period of horizontal synchronous interval H1 at a repetition rate of $f_c$. For the next horizontal synchronous interval H2, as a second row of pixel elements 50–55 are selected, the C pixel signals generated underneath the elements 50, 52, 54 are simultaneously transferred into the CCD shift register 82, and the Y pixel signals generated underneath the elements 51, 53, 55 are also simultaneously transferred into the CCD shift register 83. Then, these groups of C pixel signals and Y pixel signals are respectively swept out through the terminal 84 and the terminal 85 during the period of the horizontal synchronous interval H2 at the repetition rate of $f_c$. In the same manner as described above, in each horizontal synchronous interval, groups of pixel elements 56–61, pixel elements 62–67, pixel elements 68–73, and pixel elements 74–79 are selected. So combinations of M and G pixel signals or C and Y pixel signals are swept out through the terminals 84 and 85. This sort of repeated operation defines the content of one field interval scanning for a TV signal. In one case, a couple of repetitions of this one field interval scanning defines the content of one frame interval scanning for the TV signal. In another case, an interlaced scanning is performed with a changing of the way of selection of the pixel elements with respect to the row lines on the image sensing means 1. The above sort of operation on the image sensing means 1 is performed using the control signals 11.

From the abovenoted description of the image sensing means 1, it is clear that the M and G pixel signals are respectively produced through the terminals 84 and 85 during the period of horizontal synchronous interval H1, and the C and Y pixel signals are respectively produced through the terminals 84 and 85 during the period of horizontal synchronous interval H2. The two different modes of outputs are repeated alternately, and the first CCD shift register 82 and the second CCD shift register 83 are operated at a frequency of $f_c$ with clock signals which are inverted in phase from each other. In this way, the image sensing means 1 produces a stream of a first kind of pixel signal 9 with information of M and G pixel signals in the horizontal synchronous interval H1 and a stream of a second kind of pixel signal 10 with information of C and Y pixel signals in the next horizontal synchronous interval H2.

Figure 3:
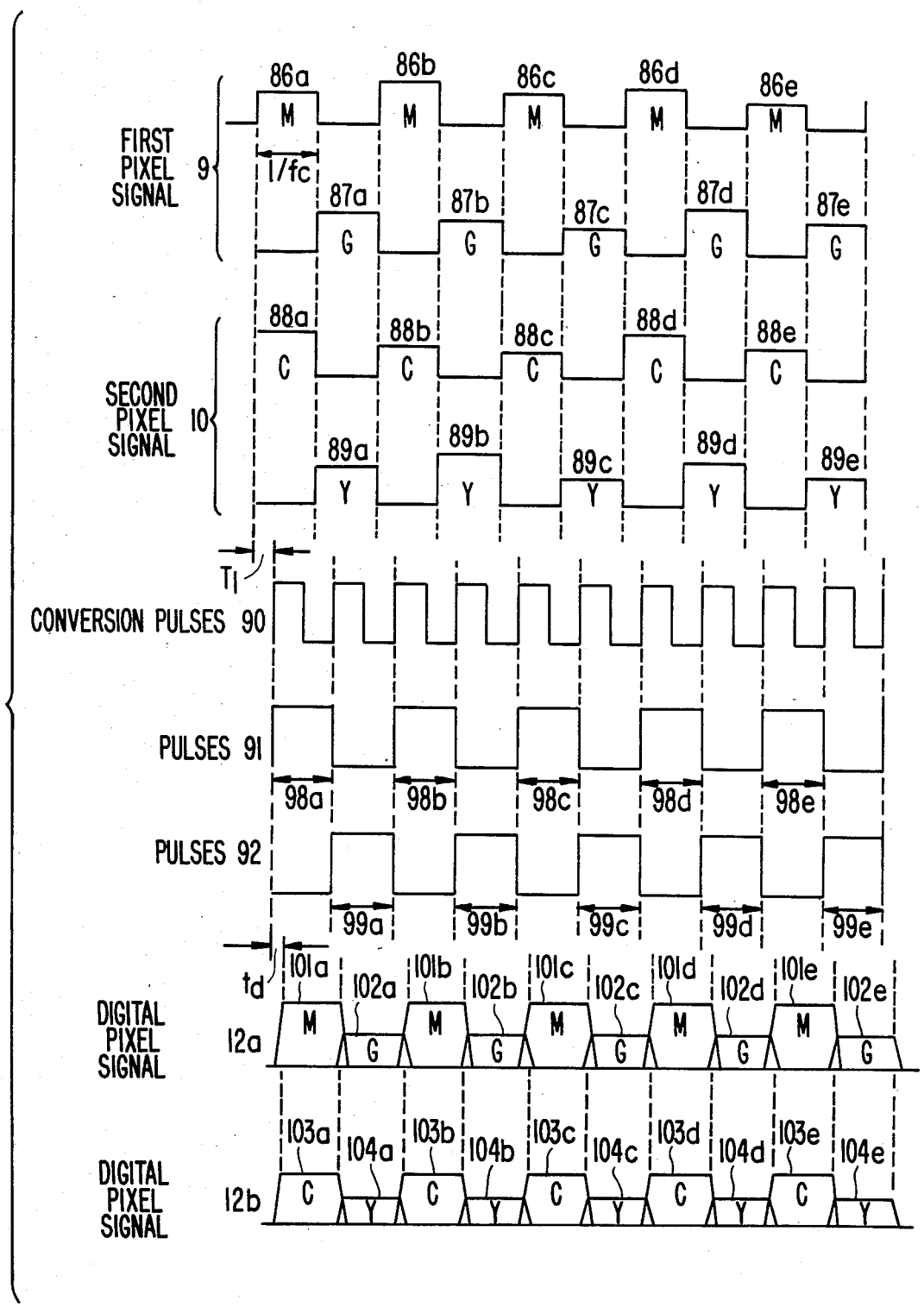
FIG. 3 shows output waveforms generated by the image sensing means and also shows waveforms of the A/D converted signals and drive-timing pulses.

FIG. 3 shows analog-sampled waveforms of the first kind of pixel signal 9 and the second kind of pixel signal 10 generated by the image sensing means 1, and also shows digital pixel signals 12a and 12b which are converted signals from the pixel signals 9 and 10 by the analog to digital (A/D) converting means 2. Timing pulses for operating the A/D converting means 2 are also shown in FIG. 3. It is necessary for conversion pulses 90 and pulses 91 and 92 to be delayed by $T_1$ with respect to analog pixel signals 9 and 10 so that the analog pixel signals 9 and 10 will be converted correctly to digital pixel signals 12a and 12b.

In the case of the image sensing means 1 shown in FIG. 2 as an example, the image sensing means 1 produces two kinds of pixel signals through the terminals 84 and 85 in a horizontal synchronous interval H1 or H2. So, it is necessary to multiplex the two kinds of pixel signals into a stream of pixel signals. To accomplish the above task, two different examples of the A/D converting means are shown in FIG. 4(a) and FIG. 4(b).

Figure 4A:
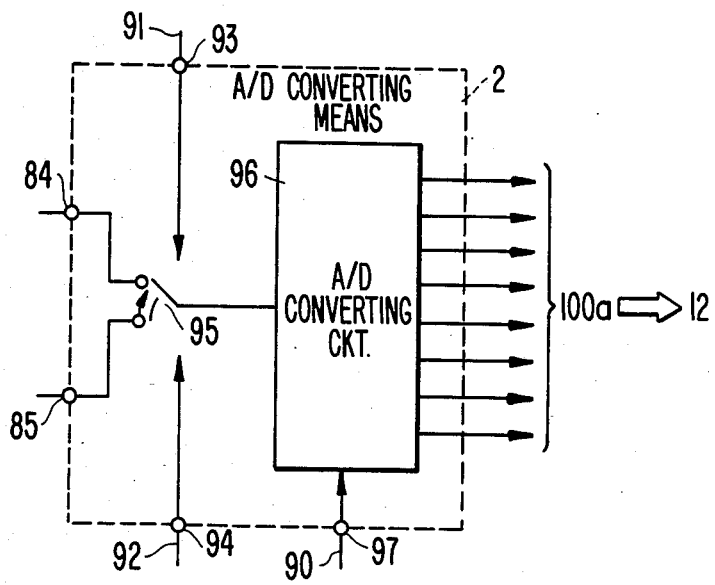
FIGS. 4(a) and 4(b) are examples of an A/D converting means.

In FIG. 4(a), an analog to digital (A/D) converting circuit 96 and an analog switch circuit 95 are produced in the A/D converting means 2. In the horizontal synchronous interval H1, the image sensing means 1 produces the first pixel signal 9 having a stream of M pixel signals 86a–86e through the terminal 84 and having a stream of G pixel signals 87a–87e through the terminal 85. During each of timing intervals 98a–98e, by receiving a stream of pulses 91 through the terminal 93 the analog switch circuit 95 selects the stream of M pixel signals 86a–86e as input signals for the A/D converting circuit 96. Then, the A/D converting circuit 96 converts the stream of M pixel signals into digital M pixel signals 101a–101e by receiving a stream of conversion pulses 90 through the terminal 97. During each of timing intervals 99a–99e, by receiving a stream of pulses 92 through the terminal 94, the analog switch circuit 95 selects a stream of G pixel signals 87a–87e as input signals to the A/D converting circuit 96. Then, the A/D converting circuit 96 converts the stream of G pixel signals 87a–87e to G pixel signals 102a–102e by receiving the stream of conversion pulses 90 through the terminal 97. In this way, the analog switch circuit 95 multiplexes two streams of pixel signals, M and G in this case, at a repetition rate of $f_c/2$, and at almost the same time that the A/D converting circuit 95 is operated at a frequency of $f_c$ synchronized with the rate of $f_c/2$. Therefore, analog information of M and G pixel signals 86a–86e, 87a–87e are converted and produced as a stream of digital pixel signals 12a through the terminal 100a. In the next horizontal synchronous interval H2, the image sensing means 1 produces a second kind of pixel signals 10 having a stream of C pixel signals 88a–88e through the terminal 84 and having a stream of Y pixel signals 89a–89e through the terminal 85. By applying the same kind of operation principles as above to the analog switch circuit 95 and A/D converting circuit 96, it is apparent that analog information of C and Y pixel signals 88a–88e, 89a–89e are converted and produced as a stream of digital pixel signals 12b through the terminal 100a.

As described above, it is clear that the A/D converting means 2 comprises the analog switch circuit 95 and the A/D converting circuit 96, in which the first set of timing pulses 18 shown in FIGS. 1, 2 and 3 correspond to the stream of conversion pulses 90.

Figure 4B:
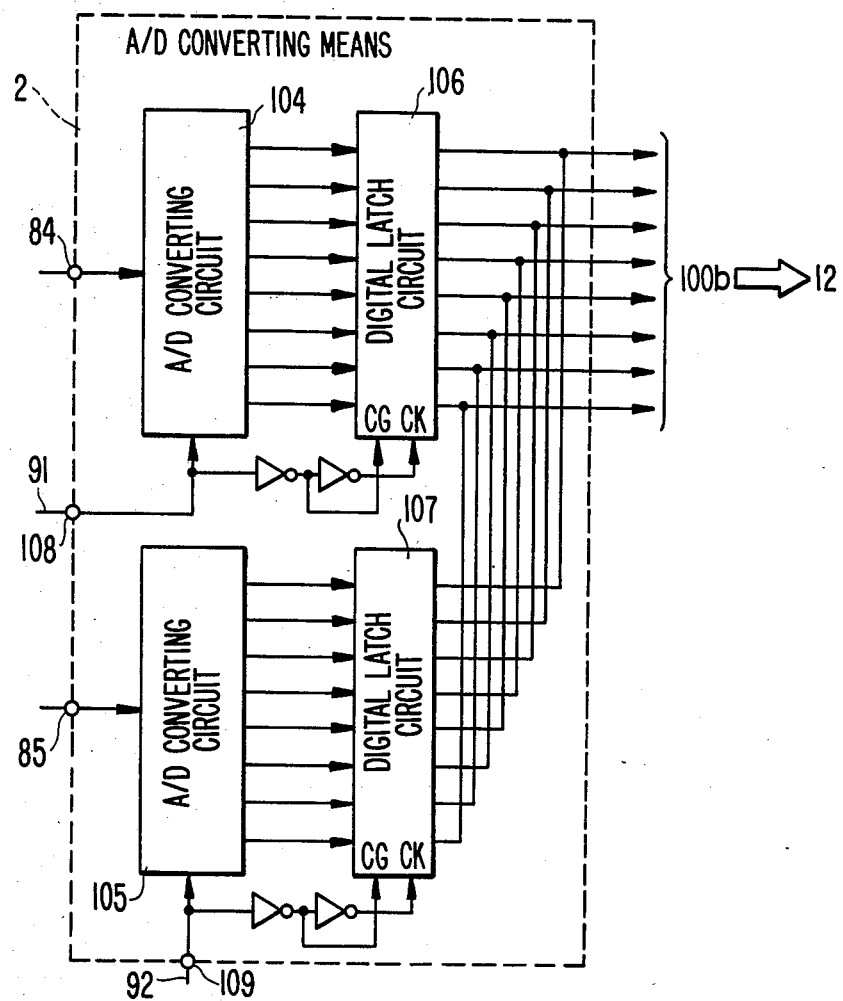

FIG. 4(b) shows another example of the A/D converting means 2. A first analog to digital (A/D) converting circuit 104 coupled to the image sensing means 1 through the terminal 84 for receiving the first or second kind of pixel signals 9 and 10 produces digital information of the pixel signals 9 and 10. A second analog to digital (A/D) converting circuit 105 coupled to the image sensing means 1 through the terminal 85 for receiving the first or second kind of pixel signals 9 and 10 also produces digital information of the pixel signals 9 and 10. A first digital latch circuit 106 coupled to the first A/D converting circuit 104 receives the digital information. A second digital latch circuit 107 coupled to the second A/D converting circuit 105 also receives the digital information. Outputs of the first and second latch circuits 106 and 107 are coupled in common, respectively, and operating timing for the first A/D converting circuit 104 and the first latch circuit 106 and for the second A/D converting circuit 105 and the second latch circuit 107 are alternately phase-shifted to produce digital pixel signals 12a and 12b. The detailed operations of the above configuration on the A/D converting means 2 will be described for the purpose of clarifying this feature of the present invention.

In the horizontal synchronous interval H1, since the image sensing means 1 produces the first kind of analog pixel signal 9, the M pixel signals 86a–86e are generated through the terminal 84 and the G pixel signals 87a–87e are generated through the terminal 85. During each of timing intervals 98a–98e, by receiving a stream of pulses 91 through the terminal 108, the first A/D converting circuit 104 converts the stream of M pixel signals 86a-86e into a stream of digital pixel signals 101a-101e. Then, the stream of digital pixel signals 101a-101e are latched by the first latch circuit 106 within a data latch-up time td toward each of the timing intervals 98a-98e and are produced as output signals through the common terminal 100b. During the above timing intervals 98a-98e, output terminals of the second latch circuit 107 are maintained in an open condition. During each of timing intervals 99a-99e, by receiving a stream of pulses 92 through the terminal 109, the second A/D converting circuit 105 converts the stream of G pixel signals 87a-87e into a stream of digital pixel signals 102a-102e. Then, the stream of the digital pixel signals 102a-102e are latched by the second latch circuit 107 within the data latch-up time td in each of the timing intervals 99a-99e and are produced as output signals through the common terminal 100b. During the above timing intervals 99a-99e, output terminals of the first latch circuit 106 are maintained in an open condition. Thus, the first digital latch circuit 106 and the second digital circuit 107 are operated alternately with a repetition rate of $f_c/2$ and output terminals of these latches 106 and 107 are connected in common. Therefore, these operating conditions make it possible to multiplex two streams of M pixel signals 86a-86e and G pixel signals 87a-87e and to convert them into digital pixel signals 12a produced through the common terminal 100b.

In the next horizontal interval H2, the image sensing means 1 produces the second kind of analog pixel signal 10 having the C pixel signals 88a-88e and the Y pixel signals 89a-89e. By applying the same kind of operation principle as above to the A/D converting circuit 104 and 105 and the digital latch circuits 106 and 107 it is possible to multiplex two streams of C pixel signals 88a-88e and Y pixel signals 89a-89e and to convert them into digital pixel signals 12b produced through the common terminal 100b.

As described above, it is apparent that the A/D converting means 2 comprises the first and second A/D converting circuits 104 and 105 and the first and second digital latch circuits 106 and 107, in which the first set of timing pulses 18 shown in FIGS. 1, 2 and 3 correspond to the stream of pulses 91 and 92.

Figure 5:
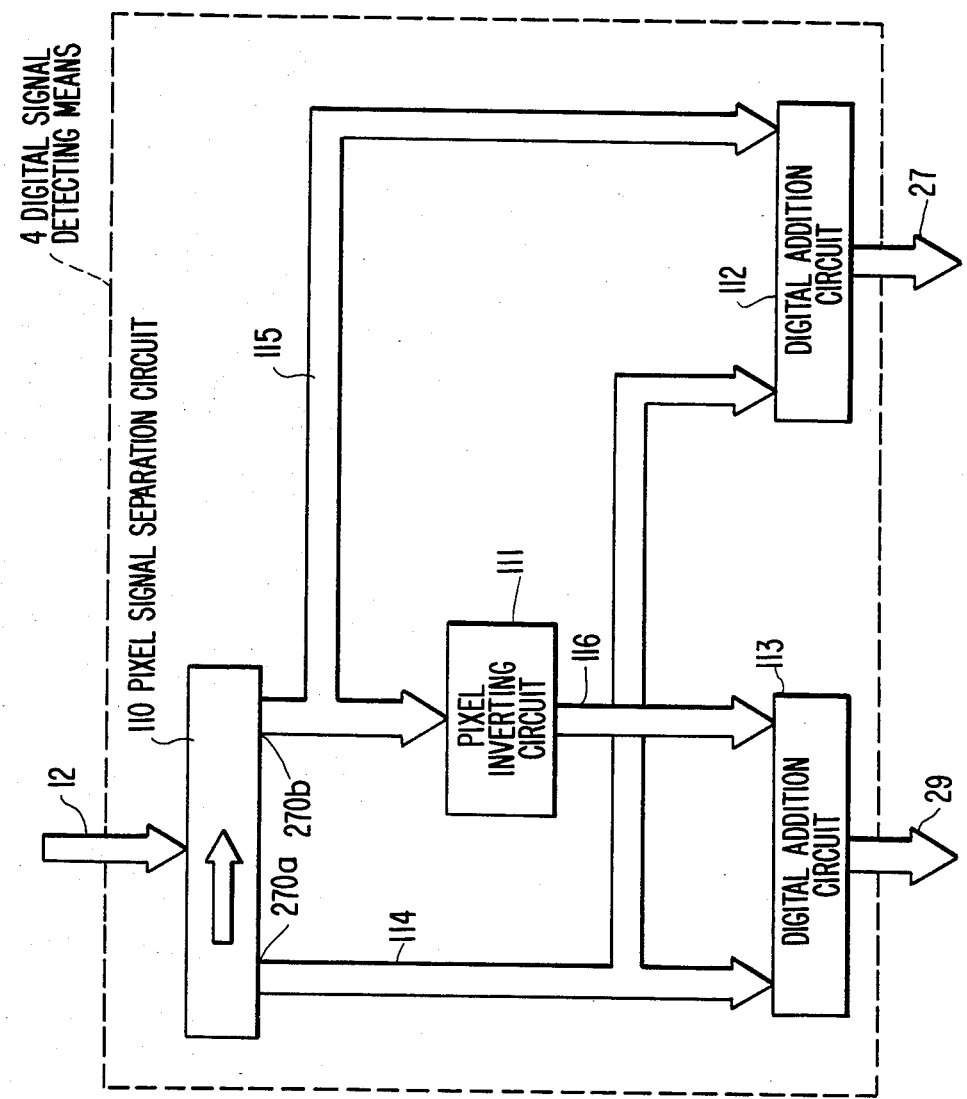
FIG. 5 is a configuration of a digital signal detecting means.
Figure 6:
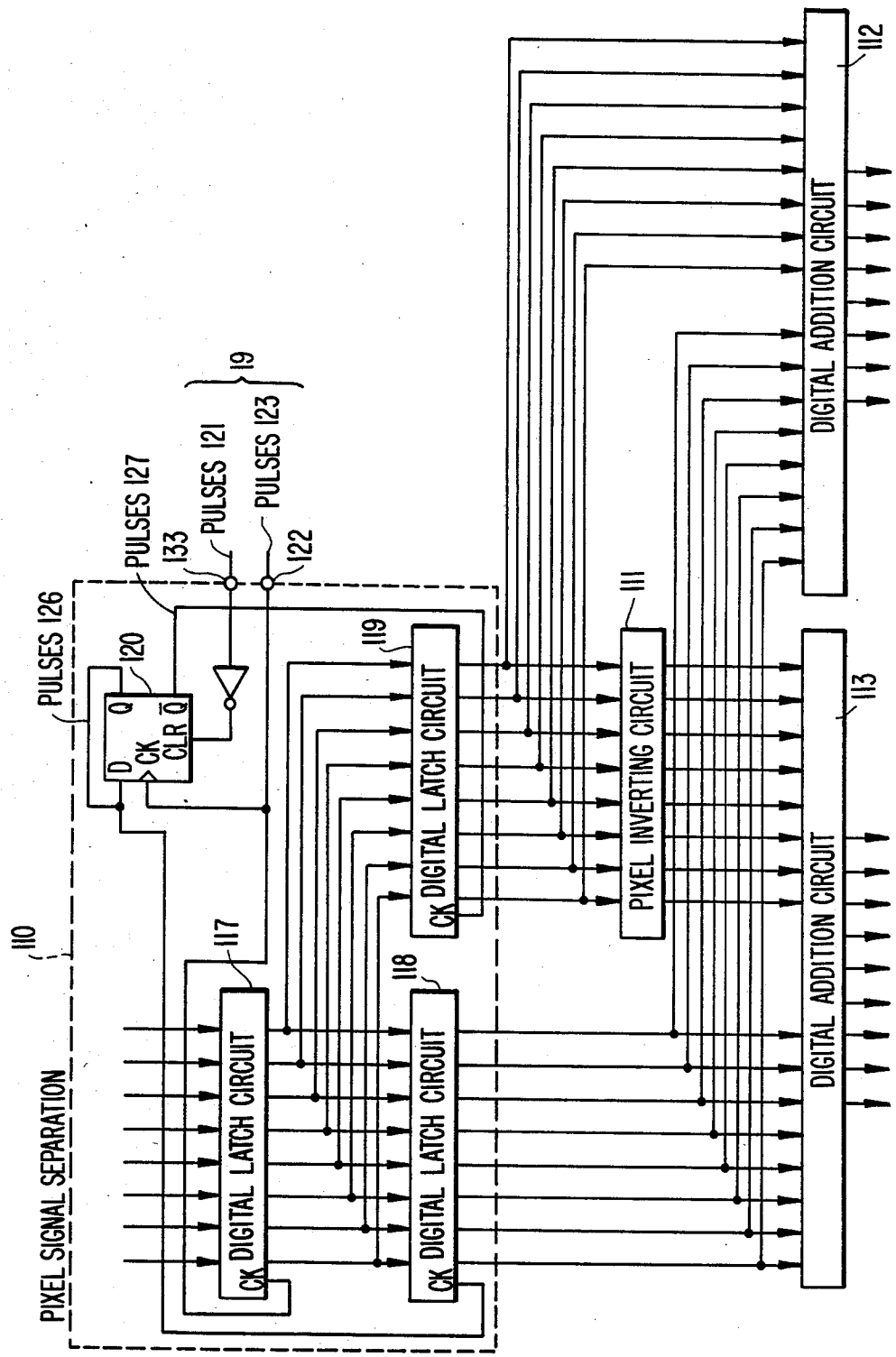
FIG. 6 is an example of a digital signal detecting means including functions of a pixel signal separation circuit.
Figure 7:
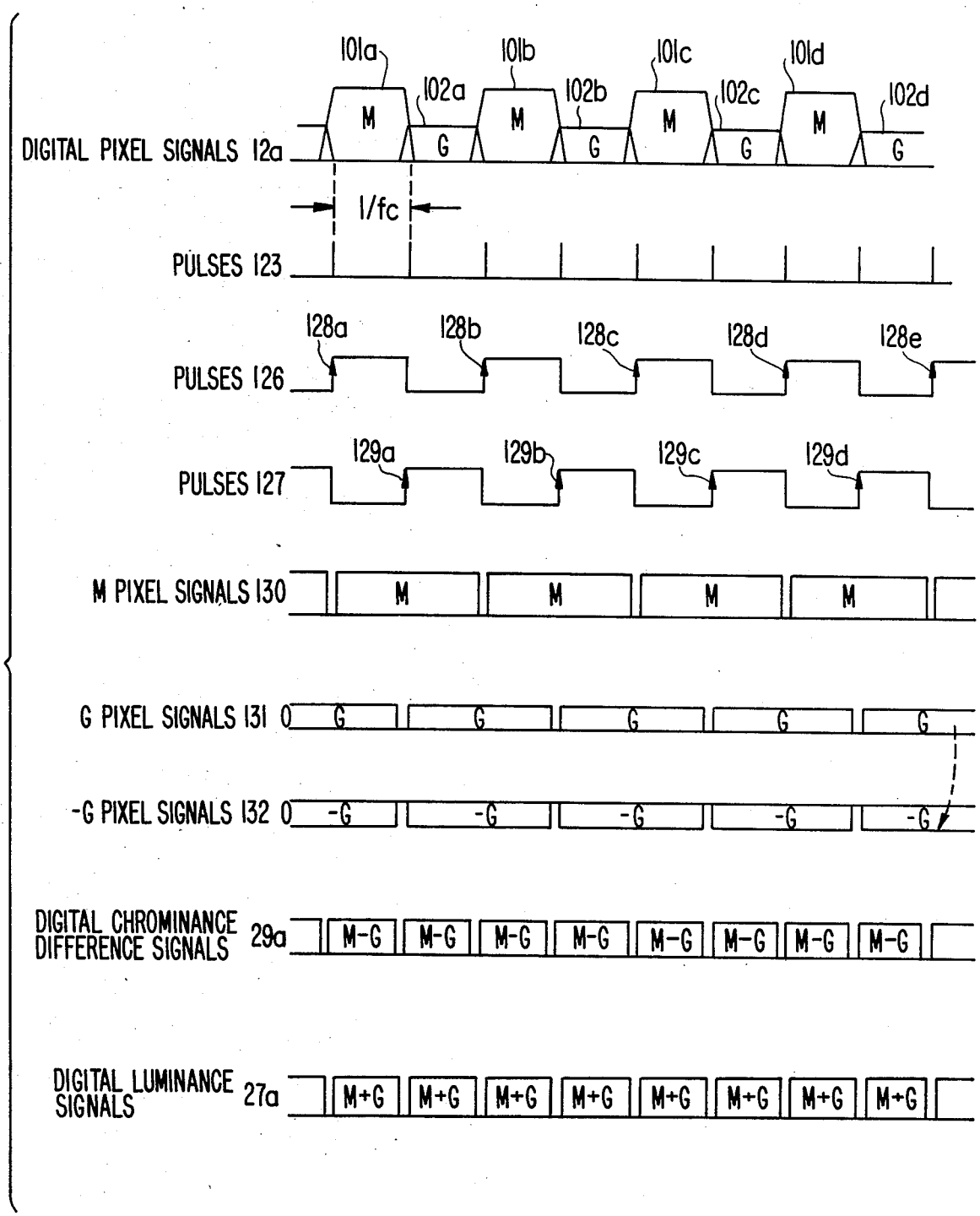
FIG. 7 shows the relationship of the timing pulses, input digital pixel signals, processed digital pixel signals and output of digital chrominance difference signals and digital luminance signals, explaining the operation of the digital signal detecting means.

FIG. 5 shows a configuration of the digital signal detecting means 4. FIG. 6 shows a detailed example of the digital signals detecting means 4. FIG. 7 shows the relationship of the timing pulses, input digital pixel signals, digital pixel signal after processing and the output of digital chrominance difference signal and the digital luminance signal generated by the digital signal detecting means 4.

The detailed operation of the digital signal detecting means 4 will be described below for the purpose of clarifying this feature of the present invention. In FIG. 5 the digital signal detecting means 4 comprises: a pixel signal separation circuit 110 having first and second output terminals 270a and 270b for selectively sampling the multiplexed input digital pixel signal 12; a first digital addition circuit 112 for adding the digital pixel signal 114 selectively demultiplexed on the terminal 270a with the digital pixel signal 115 selectively demultiplexed on the terminal 270b; a pixel inverting circuit 111 for inverting the digital pixel signal 115; and second digital addition circuit 113 for adding the digital pixel signal 114 with the output digital pixel signal 116 of the pixel inverting circuit 111.

If the image sensing means 1 with a set of M, G, C, Y color information is chosen as an example, it is the task of the digital signal detecting means 4 to receive a stream of M, G, M, G, ... or C, Y, C, Y, ... digital pixel signals 12 as inputs to produce a stream of M−G, M−G ... or C−Y, C−Y, ... digital chrominance difference signals 29 (29a or 29b) and a stream of the digital luminance signals 27.

As an example of the image sensing means 1 shown in FIG. 2, a combination of M, G, C, Y color filters is chosen. This is due to the fact that the sum of M pixel signal and G pixel signal: M+G and the sum of C pixel signal and Y pixel signal: C+Y are equal to luminance signal y1. This is, $$y1 = M + G \quad (1)$$

$$y1 = C + Y \quad (2)$$

In other words, the sensitivity of the M, G, C, Y color filters are chosen to fulfill the conditions defined by equations (1) and (2). Therefore, it is a basic function of the digital signal detecting means 4 to receive the stream of M, G, M, G pixel signals or C, Y, C, Y pixel signals, which are the digital pixel signals 12, to produce streams of M+G, M+G, ... or C+Y, C+Y, ... signals, which are the digital luminance signals 27. Although a combination of M, G, C, Y color filters is chosen as an example of the image sensing means 1 in FIG. 2, it should be understood that various modifications realizing a combination of any color ($\alpha$, $\beta$, $\gamma$, $\delta$) filters are possible, as far as outputs of pixel signals generated underneath the color filters following the equations (1), (2).

The pixel signal separation circuit 110 selectively samples a stream of G digital pixel signals and holds these for a period of $2/f_c$. The demultiplexed G digital signals 115 are inverted to −G digital pixel signals 116. By receiving the stream of the demultiplexed M digital pixels 114 and the stream of −G digital pixel signals 116, the digital addition circuit 113 produces a stream of M−G, M−G, ... digital chrominance difference signals 29a. By receiving the stream of the demultiplexed M digital pixel signals 114 and the stream of the demultiplexed G digital pixel signals 115, the digital addition circuit 112 produces a stream of M+G, M+G, ... digital luminance signals 27a. In the same manner as described above, a stream of C+Y, C+Y, ... digital luminance signals and a stream of C−Y, C−Y ... digital chrominance difference signals are also produced. In this way, if the digital pixel signal 12a is converted to a set of digital luminance signal 27a and digital chrominance difference signal 29a in a one horizontal synchronous interval, in next one horizontal synchronous interval, the digital pixel signal 12b should be converted to a set of digital luminance signal 27b and digital chrominance difference signals 29b.

In FIG. 6, a first digital latch circuit 117, a second digital latch circuit 118, a third digital latch circuit 119 and D-flip-flop circuit 120 are provided in the pixel signal separation circuit 110. A digital inverting gate circuit will be provided in the pixel inverting circuit 111. The digital pixel signals 12 are latched by the first digital latch circuit 117 at a repetition rate of $f_c$. The latched outputs of the first digital latch circuit 117 are applied to the second and third digital latch circuits 118 and 119. The second and third digital latch circuits 118 and 119 are alternately latched at the repetition rate of $f_c/2$. The timing clock pulses generated by the D-flip-flop circuit 120 control the latch circuits 118 and 119. The outputs of the third digital latch circuit 119 are supplied to the pixel inverting circuit 111. The outputs of the second digital latch circuit 118 and the outputs of the pixel inverting circuit 111 are supplied as inputs to the digital latch circuit 118 and the outputs of the third digital latch circuit 119 are supplied as inputs to the digital addition circuit 112.

The detailed timing operation on the pixel signal separation circuit shown in FIG. 6 will be described below with reference to FIG. 7.

In a horizontal synchronous interval H1, by receiving digital pixel signals 12a as inputs and by receiving a stream of pulses 123 through the terminal 122, the first digital latch circuit 117 produces a stream of M pixel signals 101a–101d and G pixel signals 102a–102d as latched outputs. At the same time, a stream of pulses 126 and a stream of pulses 127 are respectively produced through the Q output terminal and the $\overline{Q}$ output terminal of the D-flip-flop circuit 120. As the second digital latch circuit 118 is latched by the stream of pulses 126 at the time instants 128a–128e, a stream of M pixel signals 130 are selectively sampled at the repetition rate of $f_c/2$. In the same manner, as the third digital latch circuit 119 is latched by the stream of pulses 127 at the time instants 129a–129e, a stream of G pixel signals 131 are selectively sampled at the repetition rate of $f_c/2$. The M pixel signals and G pixel signals are relatively shifted by a period of one pixel interval $1/f_c$. The above demultiplexing operation is the basic operation of the pixel signal separation circuit 110. By receiving the stream of M pixel signals 130 and the stream of G pixel signals 131, the digital addition circuit 112 produces a stream of M+G, M+G, ... digital luminance signals 27a. The G pixel signals 131 are inverted into the −G pixel signals 132 by the pixel inverting circuit 111 just after the completion of the latching of the G pixel signals 131. Thus, by receiving the M pixel signals 130 and G pixel signals 132, the digital addition circuit 113 produces a stream of M−G digital chrominance difference signals 29a.

In next horizontal synchronous interval H2, as the digital pixel signals 12b with information of C, Y, C, Y, ... are supplied to the first digital latch circuit 117 as inputs, it is apparent that the digital addition circuit 112 produces a stream of C+Y digital luminance signals 27b and the digital additional circuit 113 produces a stream of C−Y digital chrominance difference signals 29b, by using the same operations described above on the digital pixel signals 12a.

In FIG. 6, the stream of pulses 123 supplied to the terminal 122 and horizontal synchronous pulses 121 supplied to the terminal 133 correspond to the set of timing pulses 19. On each of the first, second and third digital latch circuits 117, 118 and 119, the clock input terminal which controls latching timing is designated by CK.

Figure 8:
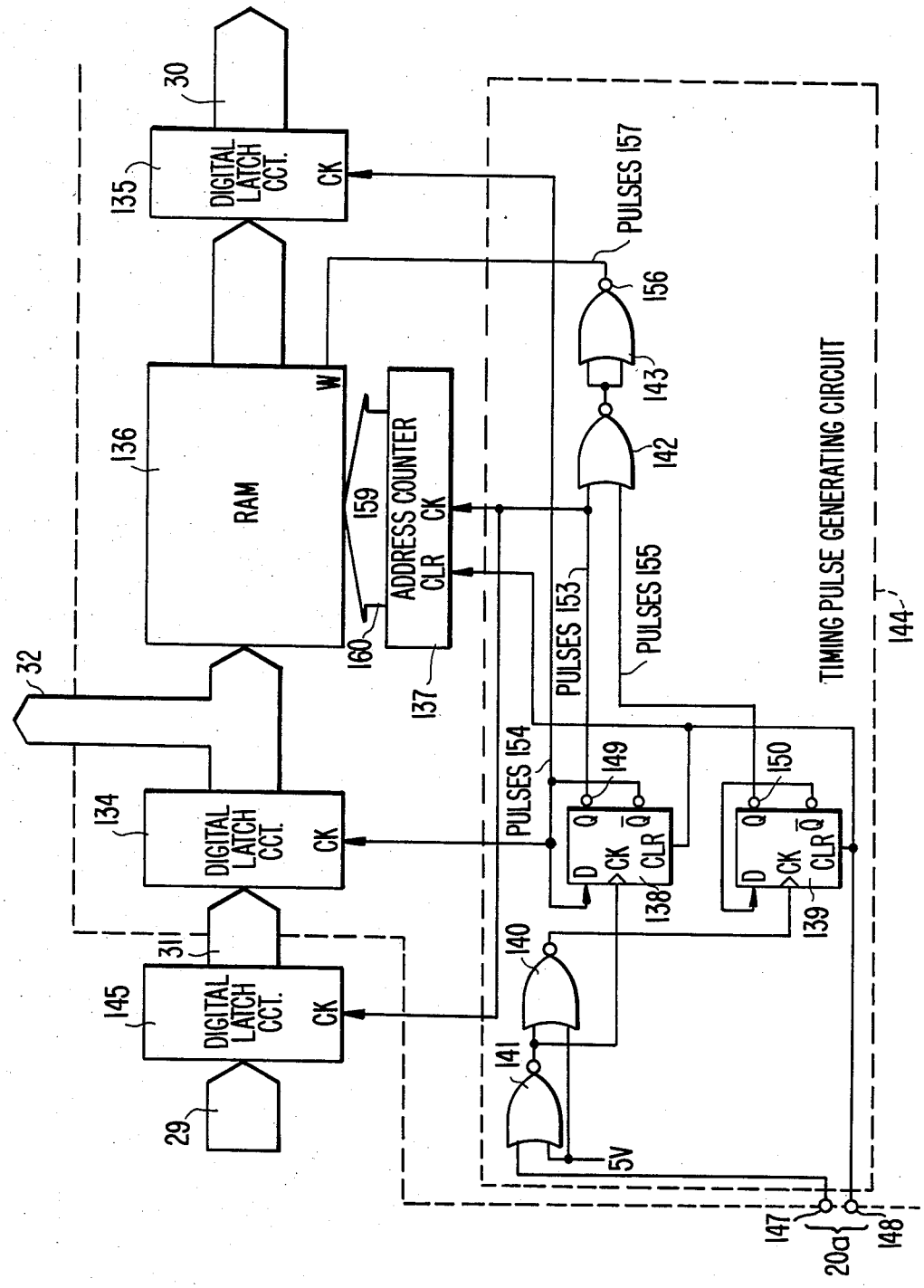
FIG. 8 is an example of a digital one horizontal synchronous period (1H) delay means.
Figure 9:
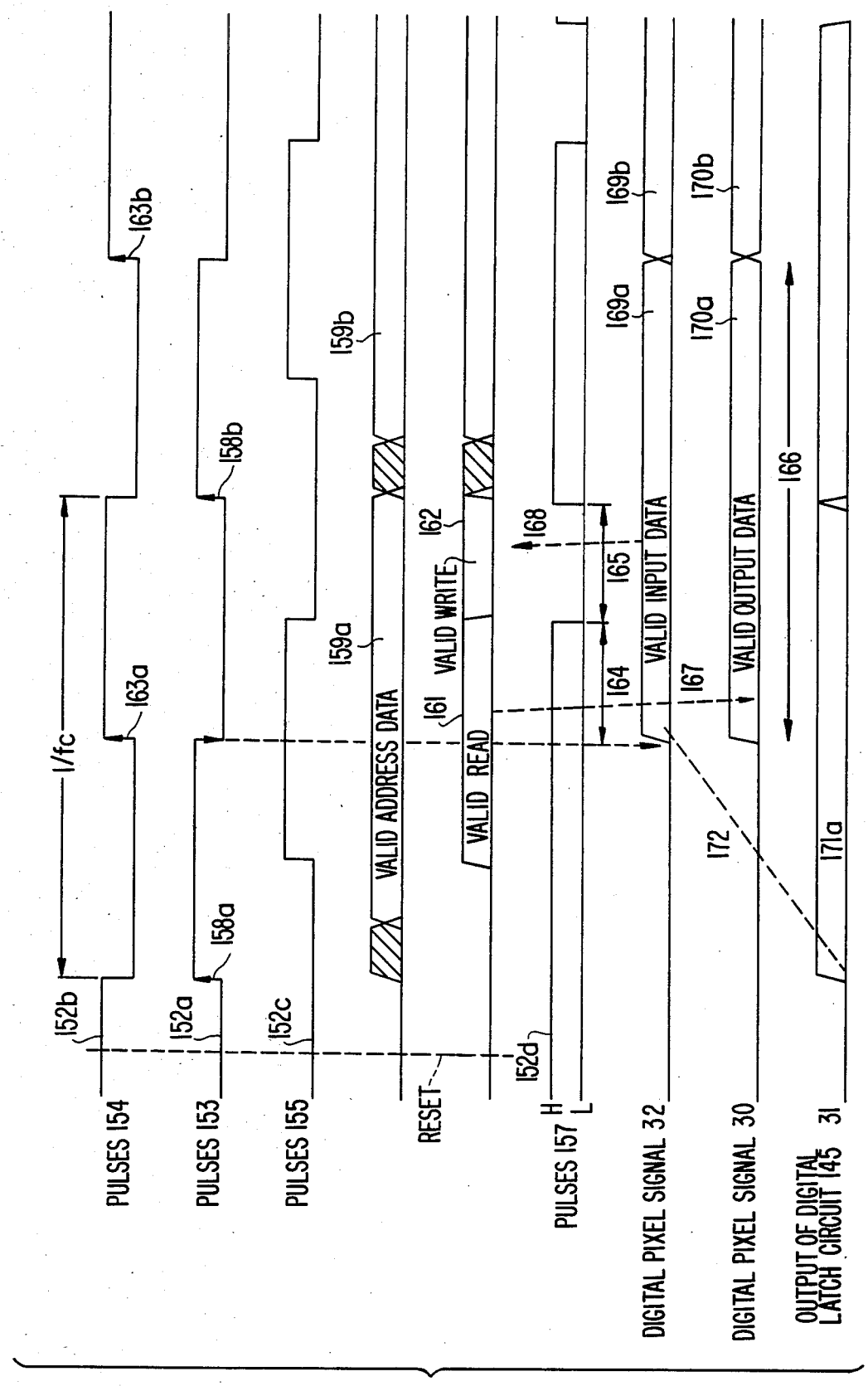
FIG. 9 shows the relationship of the timing pulses, input and output digital pixel signals, explaining the operation of the digital 1H delay means.

FIG. 8 is an example of a digital one horizontal synchronous period (1H) delay means 23. FIG. 9 shows the relationship of the timing pulses, and the input and output digital data of the digital chrominance difference signals. Hereinafter, the detailed operation of the digital 1H delay means 23 will be described for the purpose of clarifying the features of the present invention.

In FIG. 8, a second digital latch circuit 134, a third digital latch circuit 135, a random access memory (RAM) circuit 136, an address counter circuit 127, and a timing pulse generating circuit 144 are provided in the digital 1H delay means 23. Moreover, two D-flip-flop circuits 138 and 139, and four NOR gate circuits 140 to 143 are provided in the timing pulse generating circuit 144. A first digital latch circuit 134 is used as an input latch circuit of the digital 1H delay means 23.

In FIG. 8 and FIG. 9, by receiving timing clock pulses at the repetition rate of $f_c/2$ through a terminal 147 and receiving reset timing pulses at the repetition rate of 1/H through the terminal 148, the first D-flip-flop circuit 138 produces a stream of pulses 153 reset by a timing 152a through the Q terminal at the repetition rate of $f_c$ and also produces a stream of pulses 154 reset at a timing 152b through its $\overline{Q}$ terminal at the repetition rate of $f_c$, and the second D-flip-flop circuit 139 produces a stream of pulses 155 reset at a timing 152c through its Q terminal at the repetition rate of $f_c$. Moreover, by receiving the stream of pulses 153 and the stream of pulses 155 respectively through the terminals 149 and 150, a combination of NOR gates 142 and 143 produces a stream of pulses 157 through the terminal 156. The stream of pulses 157 are used for controlling the writing timing of the digital data into the RAM circuit 136. The reset timings 152a–152d defined above are repeated at the rate of 1/H.

Detailed reading and writing operations of the RAM circuit 136 will be described below by using the stream of pulses 153, 154 and 157. First, at timings 152a, 152b, and 152d, a stream of pulses 153, 154, and 157 are respectively reset, and at the same time the address counter circuit 137 is also reset. Then, at the timing 158a, the address counter circuit 137 defines a first valid address data 159a. As this address data 159a is applied to an address control circuit (not shown) located inside of the RAM circuit 136 through a parallel data bus 160, the RAM circuit 136 produces valid read-out data 161 by sensing a high (H) logic level on the stream of the pulses 157 and accepts valid write-in data 162 by sensing a low (L) logic level on the stream of the pulses 157. In accordance with the above operation, at the timing 163a, the second digital latch circuit 134 is latched and connected to input terminals of the RAM circuit 136. During a timing interval 164, in which a latch interval 166 for valid output data and an interval for valid read-out data 161 overlap, the valid-read-out data 161 stored in the first address of the RAM circuit 136 just before one horizontal synchronous interval is transferred into the third digital latch circuit 135 as shown by arrow 167 and held as valid output data 170a.

In the same manner as described above, the second digital latch circuit 134 is latched at the same timing, and input pixel data 171a stored in the first digital latch circuit 145 is shifted into the second digital latch circuit 134 as shown by arrow 172 and held as valid input data 169a. Then, during a time interval 165, in which a latch interval 166 for the valid input data 169a and an interval for the valid write-in-data 162 overlap, the valid input data 169a is stored in the first address of the RAM circuit 136 as shown by arrow 168. The new write-in data 162 is continuously stored in the first address until the first address is accessed again in next horizontal synchronous interval.

By making the same analogous considerations described above, it is apparent that, at a timing 158b, the address counter circuit 137 sets a second address data 159b, and, at a timing 163b, valid output data 170b is produced in the third digital latch circuit 135, and valid input data 169b is stored in the second address of the RAM circuit 136. In this way, by receiving the address information incremented in a one by one fashion, the RAM circuit 136 stores the digital chrominance difference signals 32 as valid input data and produces digital chrominance difference signals 30 delayed by a period of one horizontal synchronous interval.

In FIG. 8, the first digital latch circuit 145 is assumed functionally to be a digital buffer latch circuit connected between the digital signal detecting means 4 and the digital 1H delay means 23. Therefore, the digital latch circuit 145 can be taken out in the case that the digital addition circuit 113 in the digital signal detecting means 4 causes an appropriate time delay on the chrominance difference signal 29.

As an example of a memory size for the RAM circuit 136, it becomes approximately 400×n bits in the case of a clock frequency of 7.2 MHz, in which the n bits denotes the width of data shifted in parallel. Although the timing pulse generating circuit 144 comprises two D-flip-flop circuits 138 and 139 and four NOR circuits 140-143 as shown in FIG. 8, it is apparent that this means should not be recognized as the only means for realizing the timing pulse generating circuit 144. The timing clock pulses with the repetition rate of $f_c/2$ supplied through the terminal 147 and the reset timing pulses with the repetition rate of 1/H supplied through the terminal 148 correspond to the set of timing pulses 20a shown in FIG. 1.

Figure 10:
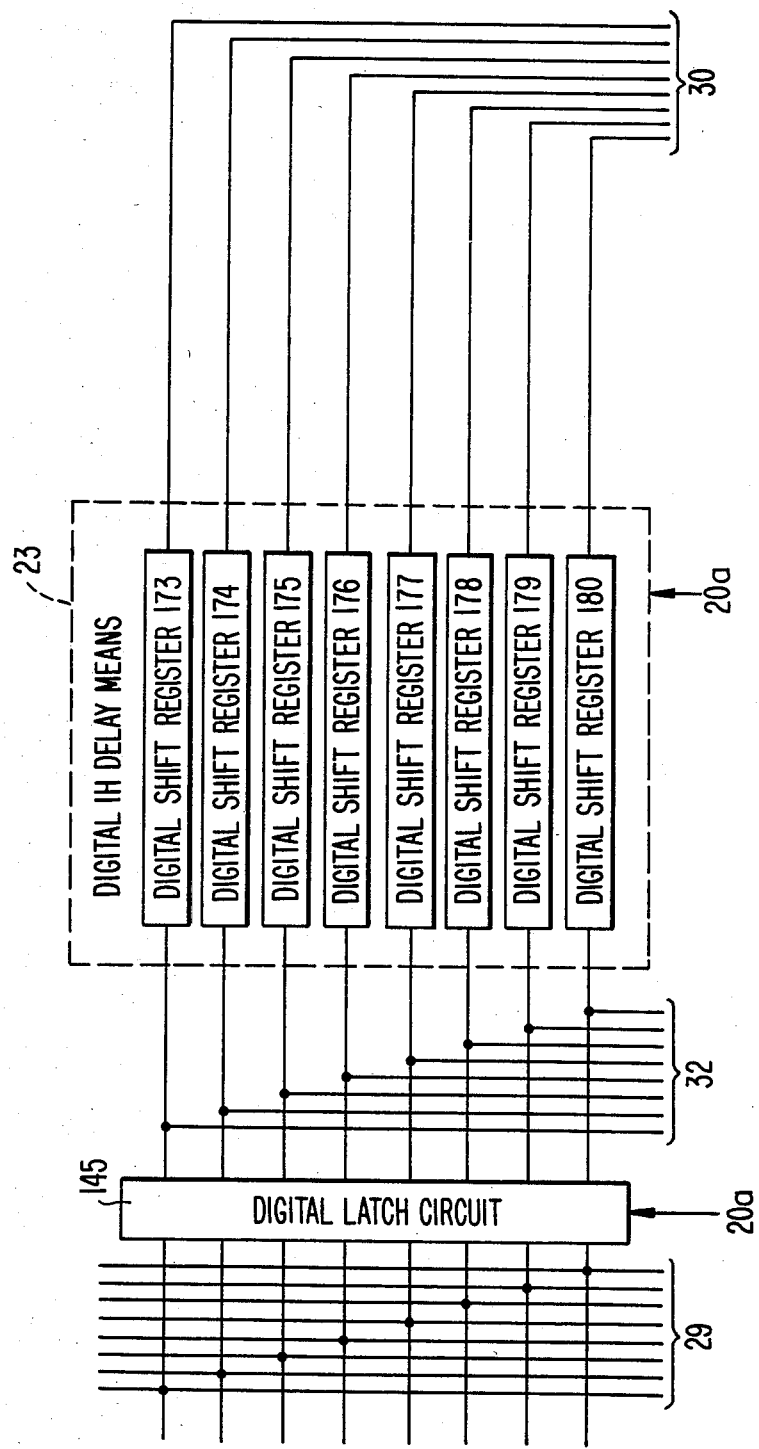
FIG. 10 is another example of the digital 1H delay means.

FIG. 10 is another example of the digital 1H delay means 23 which is composed of parallel digital shift registers 173-180 with m stages×n bits sizes. Later on, n bits is assumed to be 8 bit parallel data. The relative equation between one horizontal synchronous interval and the frequency of color burst subcarrier, $f_b=3.58$ MHz, is defined as:

$$1H = (455/2) \times (1/f_b) \qquad (3).$$

If it is assumed that the parallel 8 bit shift registers 173-180 are operated at the clock frequency of $f_c$, the number of the stages m is defined as:

$$m = (455/2) \times (f_c/f_b) \qquad (4).$$

Therefore, if the clock frequency $f_c$ is chosen to be 7.2 MHz, which is two times $f_b$, m becomes 455 bits. If the clock frequency $f_c$ is chosen to be 14.4 MHz, which is four times $f_b$, m becomes 910 bits. In this way, if $f_c$ is chosen to be an integer times $f_b$, the value of m also becomes an integer number. This means that it is possible to realize actual working parallel shift registers 173-180. In FIG. 10, the parallel 8 bit shift registers are clocked by common clocking pulses. These clocking pulses correspond to the timing pulses 20a. The purpose of the digital latch circuit 145 shown in FIG. 10 is identical with the first digital latch circuit shown in FIG. 8. As described above with reference to FIG. 10, it is apparent that the digital 1H delay means 23 comprises parallel shift registers with a size of m stages by n bits.

Figure 11:
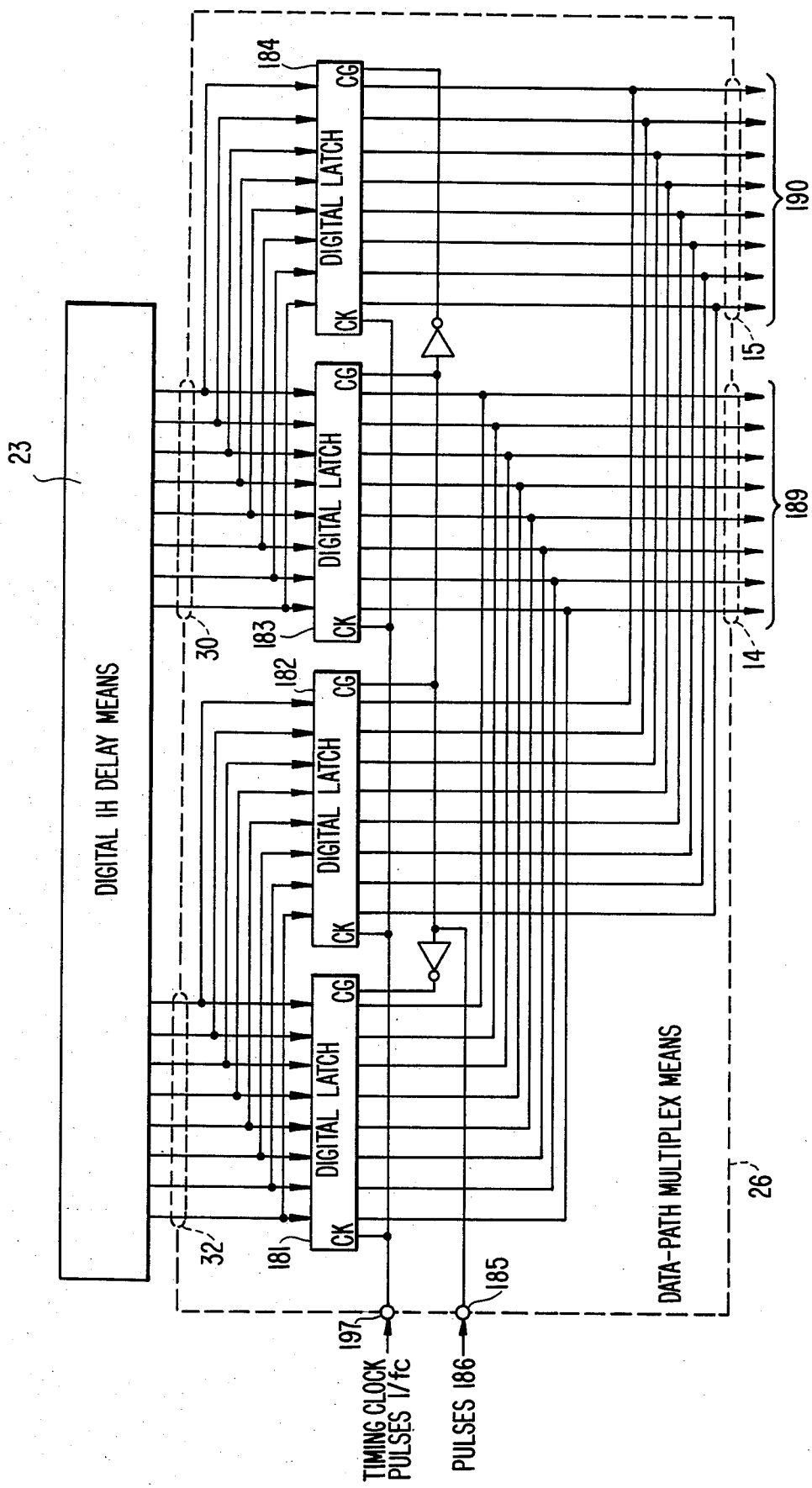
FIG. 11 is an example of the data-path multiplex means.

FIG. 11 is an example of a data-path multiplex means 26. A first digital latch circuit 181, a second digital latch circuit 182, a third digital latch circuit 183 and a fourth digital latch circuit 184 are provided in the data-path multiplex means 26. Inputs of the first digital latch circuit 181 and the second digital latch circuit 182 are connected in common, and inputs of the third digital latch circuit 183 and the fourth digital latch circuit 184 are connected in common. Outputs of the first and third digital latch circuits 181 and 183 are connected in common, and outputs of the second and fourth digital latch circuits 182 and 184 are connected in common. The gating timing for the first and fourth digital latch circuits 181 and 184 is reverse-phased to that for the second and third digital latch circuits 182 and 183, and at the repetition rate of 1/(2H).

Figure 12:
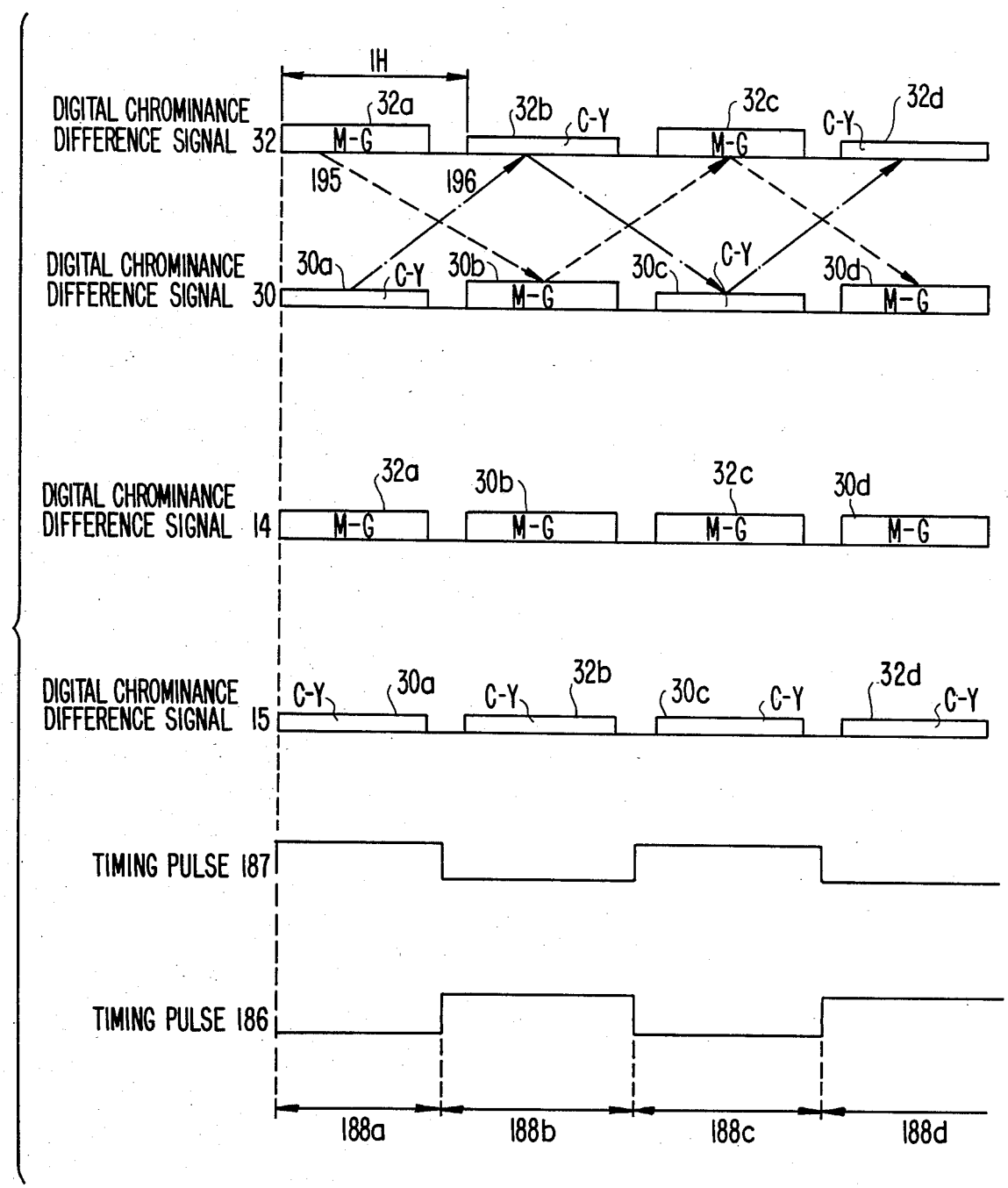
FIG. 12 shows the relationship of the timing pulses and processing digital chrominance difference signals, explaining the operation of the data-path multiple x means.

FIG. 12 shows the relationship of the digital chrominance difference signals 32 and 30 and the two independent chrominance difference signals 14 and 15 produced at the outputs of this data-path multiplex means 26. The detailed operation of the data-path multiplex means 26 will be described below for clarifying the features of the present invention.

As shown in FIG. 11, the relationship between the digital chrominance difference signal 32 and the digital chrominance difference signal 30 are alternately phase-shifted by one horizontal synchronous interval H, and both of the digital chrominance difference signals 32 and 30 are composed of a stream of either M−G or C−Y chrominance difference signals repeated at the rate of 1/(2H). Therefore, it is the task of the data-path multiplex means 26 to receive these uncontinuous M−G, C−Y, M−G, C−Y, . . . signals 32 and 30 as inputs to produce two independent and continuous streams of M−G chrominance difference signals 14 and C−Y chrominance difference signals 15. The digital chrominance difference signals 32 and the digital chrominance difference signals 30 are respectively supplied to the common inputs of the first and second digital latch circuits 181 and 182 and the common inputs of the third and fourth digital latch circuits 183 and 184. A stream of pulses 186 with the repetition rate of 1/(2H) are supplied to a terminal 185. Then, during the horizontal synchronous interval 188a, the first digital latch circuit 181 becomes conductive by receiving the stream of timing pulses 187 through CG terminal, and the third digital latch circuit 183 becomes non-conductive by receiving the stream of timing pulses 186 through CG terminal. So, information of the digital M−G chrominance difference signals 32a are produced through the common output 189 of the first and third digital latch circuits 181 and 183. Similarly, during the same interval 188a, the second latch circuit 182 becomes non-conductive by receiving the stream of pulses 186 through CG terminal and the fourth digital latch circuit 184 becomes conductive by receiving the stream of pulses 187 through CG terminal. So, information of digital C−Y chrominance difference signals 30a are produced through the common output 190 of the second and fourth digital latch circuits 182 and 184.

By using the same method described above, it is apparent that during next horizontal synchronous interval 188b, the first and fourth digital latch circuits 181 and 184 become non-conductive, and the second and third digital latch circuits 182, 183 become conductive. So, the information of the digital M−G chrominance difference signals 30b are produced through the common output 189 of the first and third digital latch circuits 181 and 183, and information of the digital C−Y chrominance difference signals 32b are produced through the common output 190 of the second and fourth digital latch circuits 182 and 184. In this way, the information of digital M−G chrominance difference signals 32a, 30b, 32c, 30d, . . . are selected by the manner shown by the dotted lines 195 and are produced as the digital chrominance difference signals 14 through the common output 189. The information of digital C−Y chrominance difference signals 30a, 32b, 30c, 32d, . . . are selected by the manner shown by the dot-and-dash line 196 and produced as the digital chrominance difference signals 15 through the common output 190.

It is additionally mentioned that the first through fourth digital latch circuits 181-184 receive clock pulses with the repetition rate of $f_c$ through the terminal 197 in accordance with the operating timing for the digital 1H delay means 23, and that the stream of pulse 186 supplied through the terminal 185 at the repetition rate of 1/(2H) and clock pulses supplied through the terminal 197 at the repetition rate of $f_c$ correspond to the set of timing pulses 20b.

Figure 13:
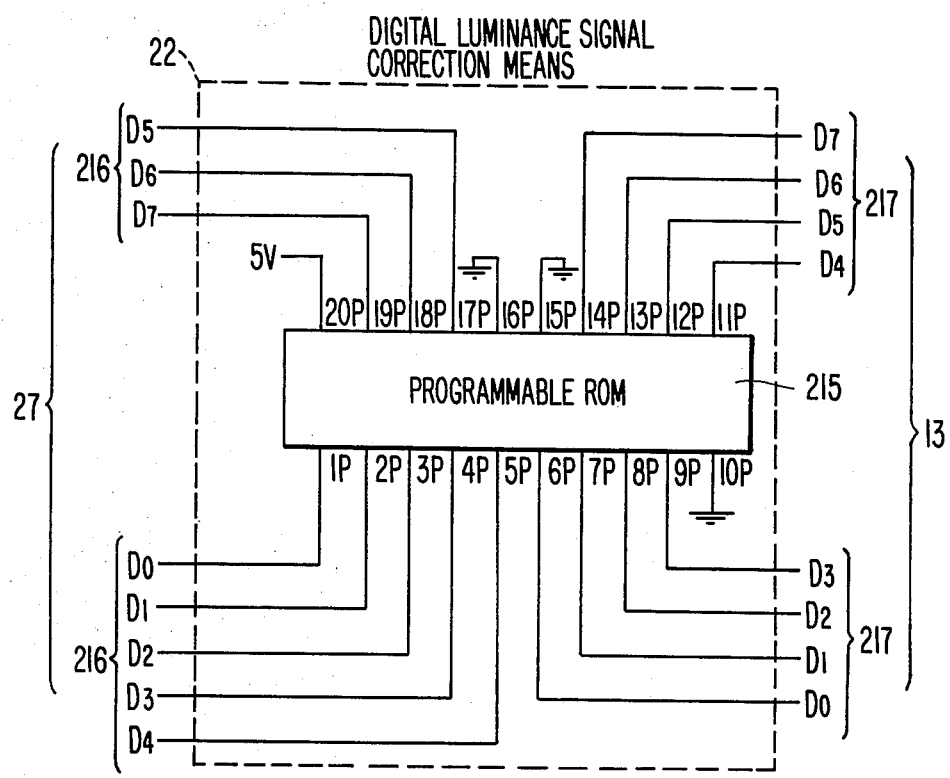
FIG. 13 is an example of a digital luminance signal correction means.
Figure 14:
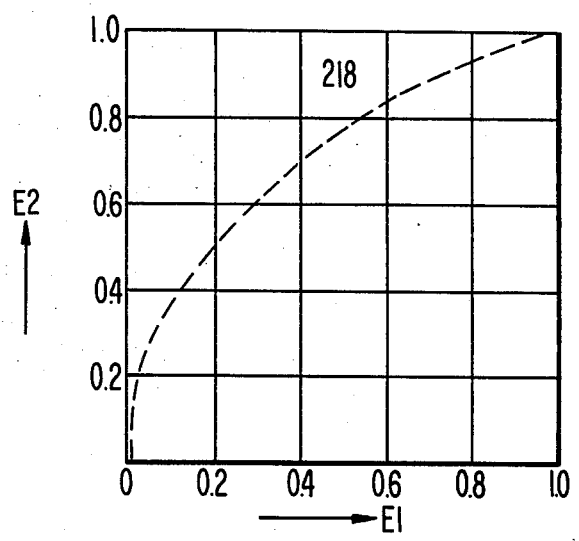
FIG. 14 shows a characteristic curve of the luminance signal correction means.

FIG. 13 is an example of a digital luminance signal correction means 22 in which a programmable read only memory (ROM) circuit 215 (such as Texas Instrument Corporation Part No. SN74471) is used for making a gamma correction on the digital luminance signal 27. The example shows the case of 8 bit parallel inputs and outputs. By receiving 8 bit digital luminance signals 27 through terminals 216, the ROM circuit 215 produces gamma corrected digital luminance signals (i.e. improved digital luminance signals) 13 at terminals 217. An example of the gamma corrected curve 218 is shown in FIG. 14, where E1 and E2 denote respectively analog converted values of 8 bit parallel input and 8 bit parallel outputs. It is apparent that the part of ROM circuit 215 may be replaced by a random access memory (RAM). By using a RAM, the characteristic curve 218 can be arbitrary programmed in accordance with an information of a requested gamma value.

As described above it is the main task of the digital luminance signal correction means 22 to provide the gamma correction on the digital luminance signals. However, other functions may be added to the means 22. For example, delay circuits (not shown) are provided to cancel out a relative output timing difference between the digital luminance signals 13 and the digital chrominance difference signals 14 and 15. This sort of difference will depend on design configurations of the digital chrominance signal processing means 3. So, in some cases, the function of the delay circuits may be provided in the digital chrominance signal processing means 3.

Figure 15:
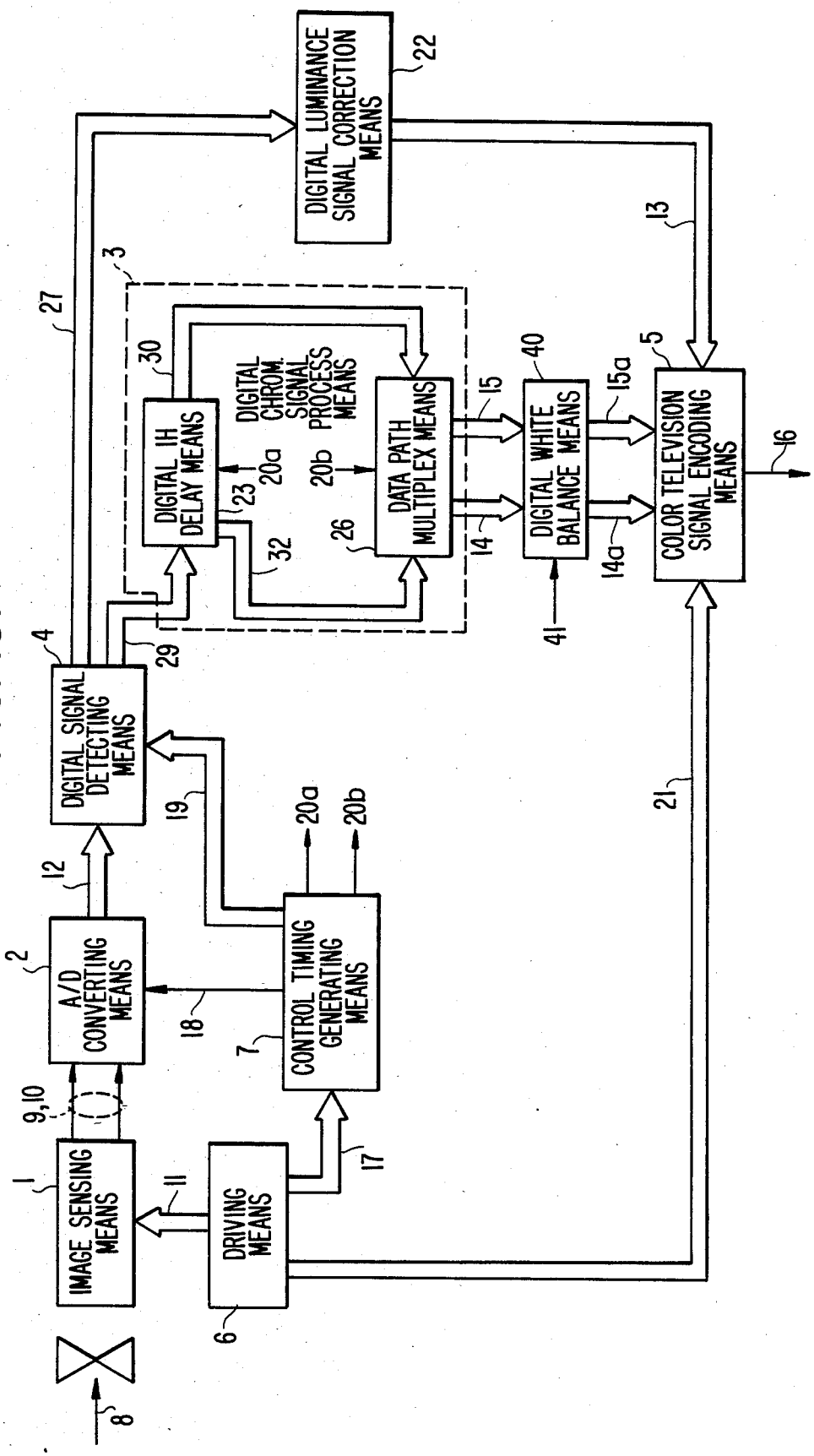
FIG. 15 is another example of the specific configuration of a digital color camera in accordance with the present invention, including a digital white balance means.

FIG. 15 shows a configuration of another example of the digital color camera in which a digital white balance means 40 is inserted into the signal transmission path from the digital chrominance signal processing means 3 to the color television encoding means 5.

Figure 16:
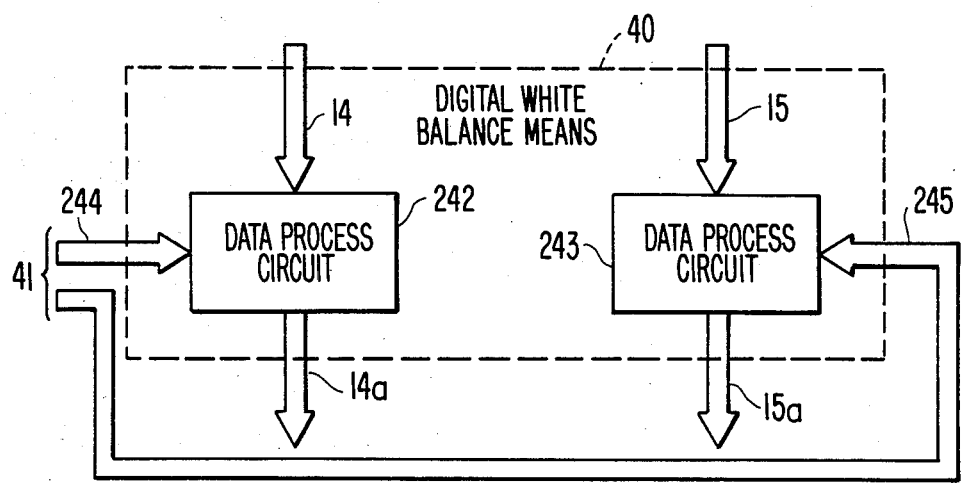
FIG. 16 is an example of the digital white balance means introduced in the configuration shown in FIG. 15.
Figure 17A:
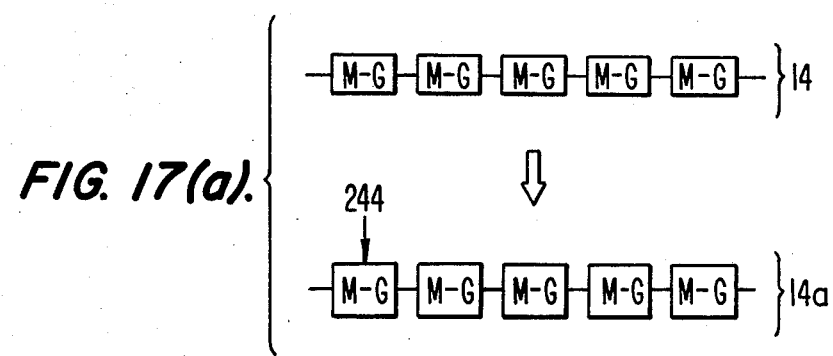
FIGS. 17(a) and 17(b) show the basic operation of the digital white balance means shown in FIG. 16.
Figure 17B:
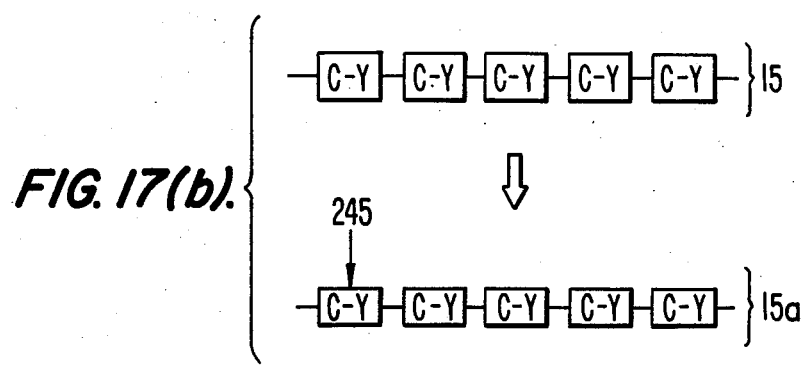

FIG. 16 is an example of the digital white balance means 40 shown in FIG. 15. First and second digital data-process circuits 242 and 243 are provided in the digital white balance means 40. Digital correction data 244 and 245 are respectively supplied to the first and second data process digital circuits 242 and 243. The data-path multiplex means 26 shown in FIGS. 1 and 15 produces the digital chrominance difference signals 14 and 15 as shown in FIG. 17(a). The digital chrominance difference signal 14 is composed of M−G, M−G, ... signals repeated at the rate of $f_c$ and continued during each horizontal synchronous interval. The digital chrominance difference signal 14 is composed of C−Y, C−Y, ... signals repeated at the rate of $f_c$ and continued during each horizontal synchronous interval.

By receiving the digital chrominance difference signal 14 and the digital correction data 244 as inputs, the digital data-process circuit 242 adds the digital correction data 244 of positive or negative values to the digital chrominance difference signal 14. As a result of this data-processing, the digital chrominance difference signal 14a is produced. By receiving the digital chrominance difference signal 15 and digital correction data 245 as inputs, the digital data-process circuit 243 adds the digital correction data 245 with positive or negative values to the digital chrominance difference signal 15. As a result of this data-process, the digital chrominance difference signal 15a is produced. In this way, the digital chrominance difference signals 14 and 15 are respectively converted to two digital chrominance difference signals 14a and 15a by getting relatively independent values of digital correction data 244 and 245. Thus, it is basically possible to realize the digital chrominance difference signals 14a and 15a with white balanced conditions.

In FIG. 16, the set of timing pulses 41 supplied to the digital white balance means 40 corresponds to the digital correction data 244 and 245. This data can be defined with an evaluation of the chrominance difference signals 14a and 15a themselves. An actually detailed method of how to define the data is realized by using a microcomputer.

FIG. 18 is an example of a specific configuration for a color television signals encoding means 5 shown in FIGS. 1 and 15. The color television signal encoding means 5 comprises: a first digital to analog (D/A) converting circuit 246 coupled to the digital chrominance signal processing means 3 for receiving the digital chrominance difference signals 14 (or 14a) to produce a first analog chrominance difference signal 260; a second digital to analog (D/A) converting circuit 247 coupled to the digital chrominance signal processing means 3 for receiving the digital chrominance difference signals 15 (or 15a) to produce a second analog chrominance difference signal 261; a third digital to analog (D/A) converting circuit 249 coupled to the digital luminance signals processing means 22 for receiving the digital luminance signals 13 to produce an analog luminance signal 262; a modulated chrominance signal producing circuit 248 coupled to the first and second D/A converting circuits 246 and 247 for receiving the first and second analog chrominance difference signals 260 and 261 to produce a modulated analog chrominance signal 263; and a mixing circuit 250 coupled to the third D/A converting circuit 249 and the modulated chrominance signal producing circuit 248 for receiving the analog luminance signal 262 and the modulated analog chrominance signal 263 to produce the color television signal 16.

The conditions of the set of pulses 21 for driving the color television encoding means 5 are as follows. Clock pulses with the repetition rate of $f_c$ are supplied to the first and second D/A converting circuits 246 and 247 through a terminal 264. Timing pulses with vertical and horizontal blanking intervals and timing pulses with a burst flag interval are supplied to the first and second D/A converting circuits 246 and 247 and the modulated chrominance signal producing circuit 248 through a terminal 252 and a terminal 253. Burst carrier pulses with the frequency of 3.58 MHz (for the NTSC case) are supplied to the modulated chrominance signal producing circuit 248 through a terminal 254. Standard bias signals for clipping the black and white levels, timing pulses with vertical and horizontal blanking intervals, timing pulses with vertical and horizontal synchronous intervals and clock pulses with the repetition rate of $f_c$ are respectively supplied to the third D/A converting circuit 249 through terminals 256, 252, 258 and 264. This means that functions for generating timing intervals of the standard television signals are included in the third D/A converting circuit 249. In this way, an example of the color television encoding means 5 is realized.

Although some embodiments of this invention have been described hereinbefore, it should be understood that they are merely explanations for the better understanding of the present invention and that various changes and modifications may be made without departing from the scope of the present invention.

What is claimed is:

1. A digital color camera comprising:

an image sensing means for receiving optical signals to produce two alternately different pixel signals composed of a first pixel signal and a second pixel signal, said first pixel signal being composed of two different $\alpha$ and $\beta$ color pixel signals which are shifted out at a frequency of $f_c$ in one of two consecutive synchronous intervals of a television signal, and said second pixel signal being composed of two other different $\gamma$ and $\delta$ color pixel signals which are different from said two different $\alpha$ and $\beta$ color pixel signals in said first pixel signal and which are shifted out at a frequency of $f_c$ in the other of said two consecutive horizontal synchronous intervals of said television signal;

an analog to digital converting means coupled to said image sensing means for converting said two alternately different pixel signals to a multiplexed digital pixel signal which is alternately different from one horizontal synchronous interval to a next horizontal synchronous interval;

a digital signal detecting means coupled to said analog to digital converting means for receiving said multiplexed digital pixel signal to produce a digital luminance signal and a digital chrominance difference signal which are alternately different from one horizontal synchronous interval to a next horizontal synchronous interval;

a digital chrominance signal processing means for receiving said digital chrominance different signal and for producing two independent digital chrominance difference signals;

a digital luminance signal correction means for receiving said digital luminance signal and for producing a gamma corrected digital luminance signal;

a color television signal encoding means for receiving said two independent digital chrominance difference signals and said gamma corrected digital luminance signal to produce a color television signal;

a control timing generating means for generating first, second and third sets of timing pulses, said sets of timing pulses respectively controlling said analog to digital converting means, said digital signal detecting means and said digital chrominance signal processing means; and a driving means for driving said image sensing means, said color television signal encoding means and said control timing generating means.

2. A digital color camera according to claim 1, wherein said image sensing means has an optical color filter which is placed on a sensing surface of said image sensing means and which has filter elements of four different colors $\alpha$, $\beta$, $\gamma$ and $\delta$, alternate rows of said filter having filter elements of colors arranged in the orders of $\alpha$, $\beta$, $\alpha$, $\beta$, ... and $\gamma$, $\delta$, $\gamma$, $\delta$, ..., respectively.

3. A digital color camera according to claim 1, wherein said digital signal detecting means comprises: a pixel signal separation circuit for selectively sampling said multiplexed digital pixel signal to produce first and second sets of digital pixel signals on first and second output terminals, respectively; a first digital addition circuit for adding said first set of digital pixel signals to said second set of digital pixel signals to produce a digital luminance signal; a pixel signal inverting circuit for inverting said second set of digital pixel signals; and a second digital addition circuit for adding said first set of digital pixel signals to an inverted second set of digital pixel signals output from said pixel signal inverting circuit to produce a digital chrominance difference signal.

4. A digital color camera according to claim 1, wherein said analog to digital converting means comprises: an analog switch circuit coupled to said image sensing means for receiving at a first input terminal said $\alpha$ or $\gamma$ color pixel signal, for receiving at a second input terminal said $\beta$ or $\delta$ color pixel signal and for producing a multiplexed stream of analog pixel signals at an output terminal; and an analog to digital converting circuit coupled to said output terminal of said analog switch circuit for converting said multiplexed stream of analog pixel signals to said multiplexed digital pixel signal, said analog switch being switched alternately between said first and second input terminals at a frequency of $f_c/2$, and said analog to digital converting circuit being operated at a frequency of $f_c$ which is synchronized with said frequency of $f_c/2$.

5. A digital color camera according to claim 1, wherein said analog to digital converting means comprises: a first analog to digital converting circuit coupled to said image sensing means for converting said $\alpha$ or $\gamma$ color pixel signal to a digital $\alpha$ or $\gamma$ color pixel signal; a second analog to digital converting circuit coupled to said image sensing means for converting said $\beta$ or $\delta$ color pixel signal to a digital $\beta$ or $\delta$ color pixel signal; a first digital latch circuit coupled to said first analog to digital converting circuit for receiving said digital $\alpha$ or $\gamma$ color pixel signal; and a second digital latch circuit coupled to said second analog to digital converting circuit for receiving said digital $\beta$ or $\delta$ color pixel signal, outputs of said first and second digital latch circuits being coupled to each other, and an operating timing of said first analog to digital converting circuit and said first digital latch circuit and an operating timing of said second analog to digital converting circuit and said second digital latch circuit being alternately synchronized to produce said multiplexed digital pixel signal.

6. A digital color camera according to claim 1, wherein said digital luminance signal correction means comprises a programmable read only memory which is programmed in accordance with a predetermined gamma value.

7. A digital color camera according to claim 1, wherein said color television signal encoding means comprises: a first digital to analog converting circuit coupled to said digital chrominance signal processing means for converting one of said two independent digital chrominance difference signals to a first analog chrominance difference signal; a second digital to analog converting circuit coupled to said digital chrominance signal processing means for converting the other of said two independent digital chrominance difference signals to a second analog chrominance difference signal; a third digital to analog converting circuit coupled to said digital luminance signal processing means for converting said gamma corrected digital luminance signal to an analog luminance signal; a modulated chrominance signal producing circuit coupled to said first and second digital to analog converting circuits for receiving said first and second analog chrominance difference signals to produce a modulated analog chrominance signal; and a mixing circuit coupled to said third digital to analog converting circuit and said modulated chrominance signal producing circuit for receiving said analog luminance signal and said modulated analog chrominance signal to produce said color television signal, clock pulses at a repetition rate of $f_c$ being supplied to said first, second and third digital to analog converting circuits, timing pulses with vertical and horizontal blanking intervals being supplied to said first, second and third digital to analog converting circuits and said modulated chrominance signal producing circuit, timing pulses with a burst flag interval being supplied to said first and second digital to analog converting circuits and said modulated chrominance signal producing circuit, burst carrier pulses being supplied to said modulated chrominance signal producing circuit, standard bias signals for clipping black and white levels and timing pulses with vertical and horizontal synchronous intervals being supplied to said third digital to analog converting circuit; wherein said clock pulses at said repetition rate of $f_c$, said timing pulses with vertical and horizontal blanking intervals, said timing pulses with a burst flag interval, said burst carrier pulses, said standard bias signals and said timing pulses with vertical and horizontal synchronous intervals are all generated by said driving means.

8. A digital color camera comprising:

an image sensing means for receiving optical signals to produce two alternately different pixel signals composed of a first pixel signal and a second pixel signal, said first pixel signal being composed of two different $\alpha$ and $\beta$ color pixel signals which are shifted out at a frequency of $f_c$ in one of two consecutive horizontal synchronous intervals of a television signal, and said second pixel signal being composed of two other different $\gamma$ and $\delta$ color pixel signals which are different from said two different $\alpha$ and $\beta$ color pixel signals in said first pixel signal and which are shifted out at a frequency $f_c$ in the other of said two consecutive horizontal synchronous intervals of said television signal;

an analog to digital converting means coupled to said image sensing means for converting said two alternately different pixel signals to a multiplexed digital pixel signal which is alternately different from one horizontal synchronous interval to a next horizontal synchronous interval;

a digital signal detecting means coupled to said analog to digital converting means for receiving said multiplexed digital pixel signal to produce a digital luminance signal and a digital chrominance difference signal which is alternately different from one horizontal synchronous interval to a next horizontal synchronous interval;

a digital one horizontal synchronous period (1H) delay means coupled to said digital signal detecting means for storing said digital chrominance difference signal for one horizontal synchronous period;

a data-path multiplex means coupled to said digital signal detecting means and said digital 1H delay means for multiplexing said digital chrominance difference signal with an output of said digital 1H delay means to produce two independent digital chrominance difference signals;

a digital luminance signal correction means coupled to said digital signal detecting means for receiving said digital luminance signal and for producing a gamma corrected digital luminance signal;

a color television signal encoding means for receiving said two independent digital chrominance difference signals and said gamma corrected digital luminance signal to produce a color television signal;

a control timing generating means for generating first, second, third and fourth sets of timing pulses, said sets of timing pulses respectively controlling said analog to digital converting means, said digital signal detecting means, said digital 1H delay means and said data-path multiplex means; and a driving means for driving said image sensing means, said color television signal encoding means and said control timing generating means.

9. A digital color camera according to claim 8, wherein said image sensing means has an optical color filter which is placed on a sensing surface of said image sensing means and which has filter elements of four different colors $\alpha$, $\beta$, $\gamma$, $\delta$, alternate rows of said filter having filter elements of colors arranged in the orders of $\alpha$, $\beta$, $\alpha$, $\beta$, ... and $\gamma$, $\delta$, $\gamma$, $\delta$, ..., respectively.

10. A digital camera according to claim 8, wherein said digital signal detecting means comprises: a pixel signal separation circuit for separating said multiplexed digital pixel signal into a digital $\alpha$ or $\gamma$ color pixel signal on a first output terminal and a digital $\beta$ or $\delta$ color pixel signal on a second output terminal; a first digital addition circuit for adding said digital $\alpha$ or $\gamma$ color pixel signal to said digital $\beta$ or $\delta$ color pixel signal; a pixel signal inverting circuit for inverting one of said two color digital pixel signals separated by said pixel signal separation circuit; and second digital addition circuit for adding the other of said two color digital pixel signals separated by said pixel signal separation circuit to an inverted color digital pixel signal output from said pixel signal inverting circuit.

11. A digital color camera according to claim 10, wherein said pixel signal separation circuit comprises: a first digital latch circuit operating at a frequency of $f_c$ for latching said multiplexed digital pixel signal; a second digital latch circuit operating at a frequency of $f_c/2$ for latching said multiplexed digital pixel signal latched by said first digital latch circuit for separating said digital $\alpha$ and $\gamma$ color pixel signal; and a third digital latch circuit operating at a frequency of $f_c/2$ delayed by $1/f_c$ relative to the operating timing of said second digital latch circuit for latching said multiplexed digital pixel signal latched by said first digital latch circuit for separating said digital $\beta$ or $\delta$ color pixel signal.

12. A digital color camera according to claim 8, wherein said digital 1H delay means comprises: a random access memory circuit; a plurality of digital latch circuits connected as input and output interfaces for said random access memory circuit; an address counter circuit for generating read and write addresses for accessing said random access memory; and a timing pulse generating circuit for controlling said address counter circuit.

13. A digital color camera according to claim 8, wherein said digital 1H delay means comprises a plurality of digital shift registers.

14. A digital color camera according to claim 8, wherein said data-path multiplex means comprises: first and second digital latch circuits which receive said digital chrominance difference signal; and third and fourth digital latch circuits which receive said digital chrominance difference signal delayed by one horizontal synchronous period from said digital 1H delay means, outputs of said first and third digital latch circuits being connected in common and outputs of said second and fourth digital latch circuits being connected in common, and output gates of said first and fourth digital latch circuits and output gates of said second and third digital latch circuits being operated alternately in synchronization with a horizontal synchronizating signal of said color television signal.

15. A digital color camera comprising:
an image sensing means for receiving optical signals to produce two alternately different pixel signals composed of a first pixel signal and a second pixel signal, said first pixel signal being composed of two different $\alpha$ and $\beta$ color pixel signals which are shifted out at a frequency $f_c$ in one of two consecutive horizontal synchronous intervals of a television signal, and said second pixel signal being composed of two other different $\gamma$ and $\delta$ color pixel signals which are different from said two different $\alpha$ and $\beta$ color pixel signals in said first pixel signal and which are shifted out at a frequency of $f_c$ in the other of said two consecutive horizontal synchronous intervals of said television signal;

an analog to digital converting means coupled to said image sensing means for converting said two alternately different pixel signals to a multiplexed digital pixel signal which is alternately different from one horizontal synchronous interval to a next horizontal synchronous interval;

a digital signal detecting means coupled to said analog to digital converting means for receiving said multiplexed digital pixel signal to produce a digital luminance signal and a digital chrominance difference signal which is alternately different from one horizontal synchronous interval to a next horizontal synchronous interval;

a digital one horizontal synchronous period (1H) delay means coupled to said digital signal detecting means for storing said digital chrominance difference signal for one horizontal synchronous period;

a data-path multiplex means coupled to said digital signal detecting means and said digital 1H delay means for multiplexing said digital chrominance difference signal with an output of said digital 1H delay means to produce two independent digital chrominance difference signals;

a digital white balance means coupled to said data-path multiplex means for producing two independent digital chrominance difference signals which are white balanced;

a digital luminance signal correction means coupled to said digital signal detecting means for receiving said digital luminance signal and for producing a gamma corrected digital luminance signal;

a color television signal encoding means for receiving said two independent digital chrominance difference signals which are white balanced and said gamma corrected digital luminance signal to produce a color television signal;

a control timing generating means for generating first, second, third and fourth sets of timing pulses, said sets of timing pulses respectively controlling said analog to digital converting means, said digital signal detecting means, said digital 1H delay means and said data-path multiplex means; and a driving means for driving said image sensing means, said color television signal encoding means and said control timing generating means;

said image sensing means having an optical color filter which is placed on a sensing surface of said image sensing means and which has filter elements of four different colors $\alpha$, $\beta$, $\gamma$ and $\delta$, alternate rows of said filter having filter elements of colors arranged in the orders of $\alpha$, $\beta$, $\alpha$, $\beta$, ... and $\gamma$, $\delta$, $\gamma$, $\delta$, ..., respectively.

16. A digital color camera according to claim 15, wherein said digital signal detecting means comprises: a pixel signal separation circuit for separating said multiplexed digital pixel signal into a digital $\alpha$ or $\gamma$ color pixel signal on a first output terminal and a digital $\beta$ or $\delta$ color pixel signal on a second output terminal; a first digital addition circuit for adding said digital $\alpha$ or $\gamma$ color pixel signal to said digital $\beta$ or $\delta$ color pixel signal; a pixel signal inverting circuit for inverting one of said two color digital pixel signals separated by said pixel signal separation circuit; and second digital addition circuit for adding the other of said two color digital pixel signals separated by said pixel signal separation circuit to an inverted color digital pixel signal output from said pixel signal inverting circuit.

17. A digital color camera according to claim 16, wherein said pixel signal separation circuit comprises: a first digital latch circuit operating at a frequency of $f_c$ for latching said multiplexed digital pixel signal; a second digital latch circuit operating at a frequency of $f_c/2$ for latching said digital $\alpha$ or $\gamma$ color pixel signal latched by said first digital latch circuit; and a third digital latch circuit operating at a frequency of $f_c/2$ delayed by $1/f_c$ relative to the operating timing of said second digital latch circuit for latching said digital $\beta$ or $\delta$ color pixel signal latched by said first digital latch circuit.

18. A digital color camera according to claim 15, wherein said data-path multiplex means comprises: first and second digital latch circuits which receive said digital chrominance difference signal; and third and fourth digital latch circuits which receive said digital chrominance difference signal delayed by one horizontal synchronous period from said digital 1H delay means, outputs of said first and third digital latch circuits being connected in common and outputs of said second and fourth digital latch circuits being connected in common, and output gates of said first and fourth digital latch circuits and output gates of said second and third digital latch circuits being operated alternately in synchronization with a horizontal synchronizing signal of said color television signal.

19. A digital color camera according to claim 15, wherein said digital 1H delay means comprises: a random access memory circuit; a plurality of digital latch circuits connected as input and output interfaces for said random access memory circuit; an address counter circuit for generating read and write addresses for accessing said random access memory; and a timing pulse generating circuit for controlling said address counter circuit.

20. A digital color camera according to claim 15, wherein said digital 1H delay means comprises a plurality of digital shift registers.

21. A digital color camera according to claim 15, wherein said white balance means comprises two data processing circuits each of which adds one of said two independent chrominance difference signals to digital correction data which is determined by evaluating said chrominance difference signals produced as outputs by said white balance means using a microcomputer means.

* * * * *